US010735729B2

United States Patent
Tsai et al.

(10) Patent No.: US 10,735,729 B2
(45) Date of Patent: Aug. 4, 2020

(54) RESIDUAL TRANSFORMATION AND INVERSE TRANSFORMATION IN VIDEO CODING SYSTEMS AND METHODS

(71) Applicants: REALNETWORKS, INC., Seattle, WA (US); Chia-Yang Tsai, Bellevue, WA (US)

(72) Inventors: Chia-Yang Tsai, Bellevue, WA (US); Wengpeng Ding, Seattle, WA (US)

(73) Assignee: REALNETWORKS, INC., Seattle, WA (US)

( * ) Notice: Subject to any disclaimer, the term of this patent is extended or adjusted under 35 U.S.C. 154(b) by 0 days.

(21) Appl. No.: 16/065,020

(22) PCT Filed: Dec. 22, 2015

(86) PCT No.: PCT/CN2015/098333
§ 371 (c)(1),
(2) Date: Jun. 21, 2018

(87) PCT Pub. No.: WO2017/107074
PCT Pub. Date: Jun. 29, 2017

(65) Prior Publication Data
US 2019/0007681 A1    Jan. 3, 2019

(51) Int. Cl.
*H04N 19/119* (2014.01)
*H04N 19/122* (2014.01)
(Continued)

(52) U.S. Cl.
CPC ......... *H04N 19/119* (2014.11); *H04N 19/122* (2014.11); *H04N 19/13* (2014.11);
(Continued)

(58) Field of Classification Search
None
See application file for complete search history.

(56) References Cited

U.S. PATENT DOCUMENTS

| 8,942,282 B2 | 1/2015 | Karczewicz et al. |
| 2007/0036222 A1* | 2/2007 | Srinivasan ........... H04N 19/176 375/240.18 |

(Continued)

FOREIGN PATENT DOCUMENTS

| CN | 103248885 A | 8/2013 |
| WO | 00/33583 A1 | 6/2000 |

OTHER PUBLICATIONS

Extended European Search Report, dated Jul. 16, 2019, for European Application No. 15 91 1073, 7 pages.
(Continued)

*Primary Examiner* — Clifford Hilaire
(74) *Attorney, Agent, or Firm* — Seed IP Law Group LLP

(57) ABSTRACT

A transform block processing procedure wherein a maximum coding-block size and a maximum transform-block size for an unencoded video frame is determined. The unencoded video frame is divided into a plurality of coding-blocks including a first coding-block and the first coding block is divided into at least one prediction block and a plurality of transform blocks. The size of the transform blocks depend at least in part on the size of the coding block and the corresponding prediction blocks. The transform blocks are then encoded, thereby generating a video data payload of an encoded bit-stream. A frame header of the encoded bit-stream, including a maximum coding-block size flag and a maximum-transform-block-size flag, is generated.

12 Claims, 14 Drawing Sheets

(51) Int. Cl.
*H04N 19/159* (2014.01)
*H04N 19/18* (2014.01)
*H04N 19/463* (2014.01)
*H04N 19/13* (2014.01)
*H04N 19/70* (2014.01)
*H04N 19/91* (2014.01)
*H04N 19/176* (2014.01)
*H04N 19/61* (2014.01)
*H04N 19/136* (2014.01)
*H04N 19/186* (2014.01)

(52) U.S. Cl.
CPC ......... *H04N 19/136* (2014.11); *H04N 19/159* (2014.11); *H04N 19/176* (2014.11); *H04N 19/18* (2014.11); *H04N 19/186* (2014.11); *H04N 19/463* (2014.11); *H04N 19/70* (2014.11); *H04N 19/91* (2014.11); *H04N 19/61* (2014.11)

(56) References Cited

U.S. PATENT DOCUMENTS

| 2011/0249721 | A1  | 10/2011 | Karczewicz et al. |
| 2012/0230417 | A1* | 9/2012  | Sole Rojals ......... H04N 19/463 375/240.18 |
| 2013/0272384 | A1* | 10/2013 | Yu ....................... H04N 19/129 375/240.03 |
| 2013/0336385 | A1  | 12/2013 | Budagavi |
| 2014/0105279 | A1  | 4/2014  | Hattori |

OTHER PUBLICATIONS

Tamhankar et al., "An Overview of H.264/MPEG-4 Part 10," Proceedings of Multimedia Communications, IOS Press, vol. 1, Jul. 2, 2003, pp. 1-51.

Kim et al., "Context-adaptive coded block pattern coding for H.264/AVC," IEICE Electronics Express, vol. 8, No. 21, Jan. 1, 2011, pp. 1777-1782.

International Search Report, dated Aug. 29, 2016 for PCT/CN2015/098333, 3 pages.

Written Opinion, dated Aug. 29, 2016 for PCT/CN2015/098333, 3 pages.

* cited by examiner

RESIDUAL TRANSFORMATION AND INVERSE TRANSFORMATION IN VIDEO CODING SYSTEMS AND METHODS This Application is a continuation in part of previously filed PCT Application No. PCT/CN2015/075599, titled Residual Transformation and Inverse Transformation in Video Coding Systems and Methods, filed 31 Mar. 2015, the entire disclosure of which is hereby incorporated for all purposes.

FIELD

Background

The advent of digital multimedia such as digital images, speech/audio, graphics, and video have significantly improved various applications as well as opened up brand new applications due to relative ease by which it has enabled reliable storage, communication, transmission, and, search and access of content. Overall, the applications of digital multimedia have been many, encompassing a wide spectrum including entertainment, information, medicine, and security, and have benefited the society in numerous ways. Multimedia as captured by sensors such as cameras and microphones is often analog, and the process of digitization in the form of Pulse Coded Modulation (PCM) renders it digital. However, just after digitization, the amount of resulting data can be quite significant as is necessary to re-create the analog representation needed by speakers and/ or TV display. Thus, efficient communication, storage or transmission of the large volume of digital multimedia content requires its compression from raw PCM form to a compressed representation. Thus, many techniques for compression of multimedia have been invented. Over the years, video compression techniques have grown very sophisticated to the point that they can often achieve high compression factors between 10 and 100 while retaining high psycho-visual quality, often similar to uncompressed digital video.

While tremendous progress has been made to date in the art and science of video compression (as exhibited by the plethora of standards bodies driven video coding standards such as MPEG-1, MPEG-2, H.263, MPEG-4 part2, MPEG-4 AVC/H.264, MPEG-4 SVC and MVC, as well as industry driven proprietary standards such as Windows Media Video, RealVideo, On2 VP, and the like), the ever increasing appetite of consumers for even higher quality, higher definition, and now 3D (stereo) video, available for access whenever, wherever, has necessitated delivery via various means such as DVD/BD, over the air broadcast, cable/satellite, wired and mobile networks, to a range of client devices such as PCs/laptops, TVs, set top boxes, gaming consoles, portable media players/devices, smartphones, and wearable computing devices, fueling the desire for even higher levels of video compression. In the standards-body-driven standards, this is evidenced by the recently started effort by ISO MPEG in High Efficiency Video Coding (HEVC) which is expected to combine new technology contributions and technology from a number of years of exploratory work on H.265 video compression by ITU-T standards committee.

All aforementioned standards employ a general interframe predictive coding framework that involves reducing temporal redundancy by compensating for motion between frames of video. The basic concept is to remove the temporal dependencies between neighboring pictures by using block matching method. At the outset of an encoding process, each frame of the unencoded video sequence is grouped into one of three categories: I-type frames, P-type frames, and B-type frames. I-type frames are intra-coded. That is, only information from the frame itself is used to encode the picture and no inter-frame motion compensation techniques are used (although intra-frame motion compensation techniques may be applied).

The other two types of frames, P-type and B-type, are encoded using both inter-frame motion compensation and intra prediction techniques. The difference between P-picture and B-picture is the temporal direction of the reference pictures used for motion compensation. P-type pictures utilize information from previous pictures (in display order), whereas B-type pictures may utilize information from both previous and future pictures (in display order).

For P-type and B-type frames, each frame is then divided into blocks of pixels, represented by coefficients of each pixel's luma and chrominance components; if the block is not intra-coded, one or more motion vectors are obtained for each block (because B-type pictures may utilize information from both a future and a past coded frame, two motion vectors may be encoded for each block). A motion vector (MV) represents the spatial displacement from the position of the current block to the position of a similar block in another, previously encoded frame (which may be a past or future frame in display order), respectively referred to as a reference block and a reference frame. The difference, if any, between the reference block and the current block is determined and a residual (also referred to as a "residual signal") is obtained. Therefore, for each block of an inter-coded frame, only the residuals and motion vectors need to be encoded rather than the entire contents of the block. By removing this kind of temporal redundancy between frames of a video sequence, the video sequence can be compressed.

To further compress the video data, after inter or intra frame prediction techniques have been applied, the coefficients of the residual signal are often transformed from the spatial domain to the frequency domain (e.g. using a discrete cosine transform ("DCT") or a discrete sine transform ("DST")). For naturally occurring images, such as the type of images that typically make up human perceptible video sequences, low-frequency energy is always stronger than high-frequency energy. Residual signals in the frequency domain therefore get better energy compaction than they would in spatial domain. After forward transform, the coefficients and motion vectors may be quantized and entropy encoded before being packetized or otherwise processed, e.g. for transmission over a network such as the Internet.

Entropy encoding is a lossless data compression scheme that is independent of the specific characteristics of the medium. One of the main types of entropy coding creates and assigns a unique prefix-free code to each unique symbol that occurs at the input of the encoder. These entropy encoders then compress data by replacing each fixed-length input symbol with a corresponding variable-length prefix-free output code word. The length of each code word is approximately proportional to the negative logarithm of the probability. Therefore, the most common symbols use the shortest codes. A Huffman code is a particular type of optimal prefix code that is commonly used for lossless data compression. The output from Huffman's algorithm can be viewed as a variable-length code table for encoding a source symbol. The Huffman algorithm derives this table from the estimated probability or frequency of occurrence (weight) for each possible value of the source symbol.

On the decoder side, inversed quantization and inversed transforms are applied to recover the spatial residual signal. These are typical transform/quantization processes in many video compression standards. A reverse prediction process may then be performed in order to generate a recreated version of the original unencoded video sequence.

In past standards, the blocks used in coding were generally sixteen by sixteen pixels (referred to as macroblocks in many video coding standards). However, since the development of these standards, frame sizes have grown larger and many devices have gained the capability to display higher than "high definition" (or "HD") frame sizes, such as 2048×1530 pixels. Thus it may be desirable to have larger blocks to efficiently encode the motion vectors for these frame size, e.g. 64×64 pixels. It follows that it is also desirable to increase the size of the blocks of residual signals that are transformed from the spatial domain to the frequency domain.

DISCLOSURE OF INVENTION

One aspect of the present invention is a video-encoder-device-implemented method of encoding an unencoded video frame to generate an encoded bit-stream representative of the unencoded video frame, the encoded bit-stream including at least a coding block header and a video data payload, the video-encoder-device-implemented method comprising: obtaining a coding block representing image data for a portion of said unencoded video frame, said coding block including a plurality of coefficient blocks, each coefficient block of said plurality of coefficient blocks containing a plurality of coefficients; obtaining a coefficient block pattern code word corresponding to said plurality of coefficient blocks; generating the coding block header of the encoded bit-stream, the coding block header including said coefficient block pattern code word; and generating the video data payload of the encoded bit-stream; wherein, if a first coefficient of a first coefficient block of said plurality of coefficient blocks has an non-zero value, said video data payload includes a descriptor code word corresponding to said first coefficient block and a level code word corresponding to said first coefficient block.

Another aspect of the present invention is a video-encoder-device-implemented method of encoding an unencoded video frame to generate an encoded bit-stream representative of the unencoded video frame, the encoded bit-stream including at least a coding block header and a video data payload, the video-encoder-device-implemented method comprising: obtaining a coding block representing image data for a portion of said unencoded video frame, said coding block including a plurality of coefficient block sets, each coefficient block sets including a plurality of coefficient blocks, each of said plurality of coefficient blocks containing a plurality of coefficients; obtaining a plurality of coding block pattern code words, each of said plurality of coding block pattern code words corresponding to one of said plurality of coefficient block sets; generating the coding block header of the encoded bit-stream, the coding block header including said plurality of coding block pattern code words; and generating the video data payload of the encoded bit-stream; wherein, if a first coefficient of a first coefficient block of a first coefficient block set of said plurality of coefficient block has a non-zero value, said video data payload includes at least a descriptor code word corresponding to said first coefficient block and a level code word corresponding to said first coefficient block.

DETAILED DESCRIPTION

Figure 1:
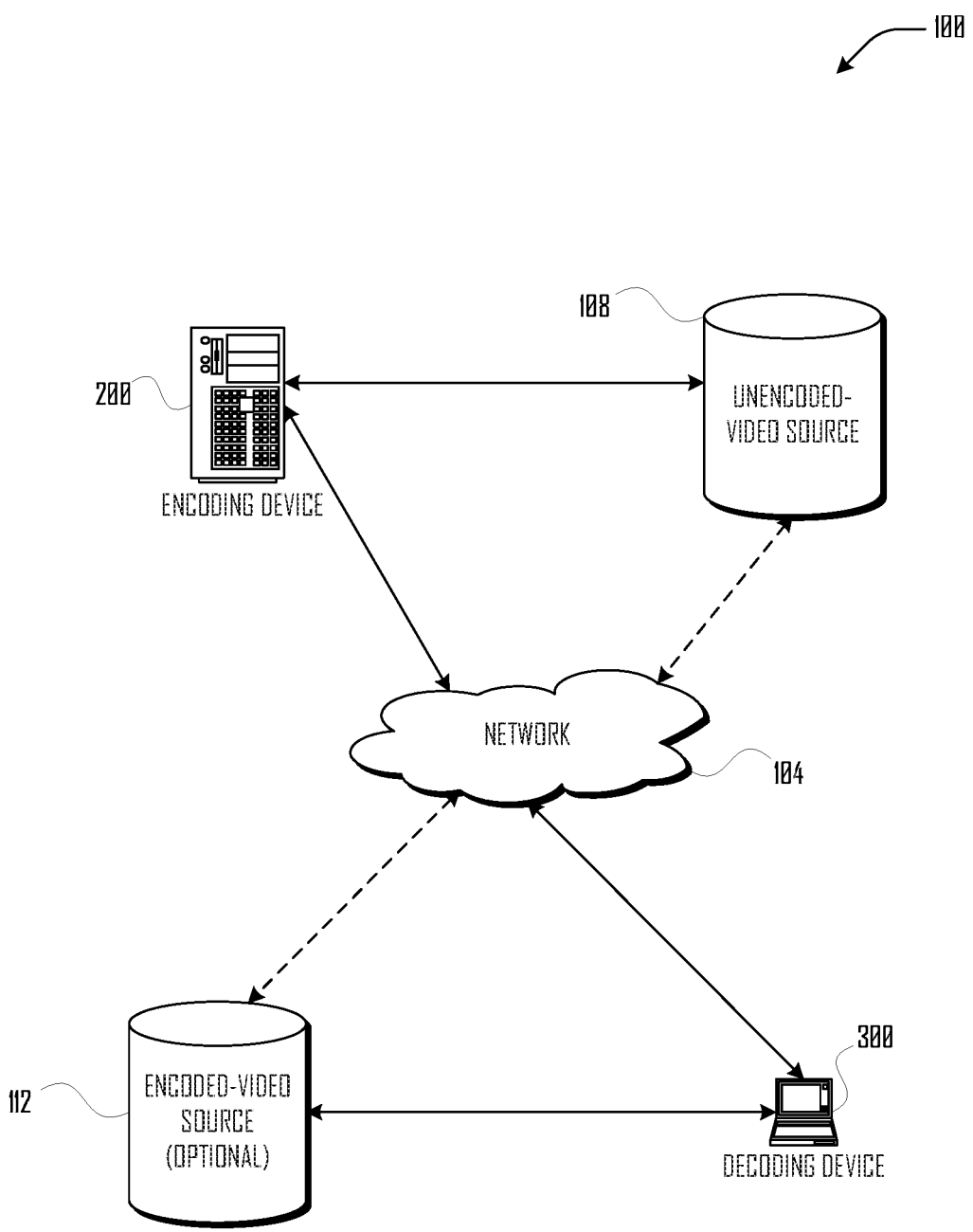
FIG. 1 illustrates an exemplary video encoding/decoding system according to one embodiment.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file servers, computer servers and memory storage devices. Each of these conventional distributed computing components is accessible by the processor via a communication network.

The phrases "in one embodiment," "in at least one embodiment," "in various embodiments," "in some embodiments," and the like may be used repeatedly herein. Such phrases do not necessarily refer to the same embodiment. The terms "comprising," "having," and "including" are synonymous, unless the context dictates otherwise. Various embodiments are described in the context of a typical "hybrid" video coding approach, as was described generally above, in that it uses inter-/intra-picture prediction and transform coding.

Reference is now made in detail to the description of the embodiments as illustrated in the drawings. While embodiments are described in connection with the drawings and related descriptions, it will be appreciated by those of ordinary skill in the art that alternate and/or equivalent implementations may be substituted for the specific embodiments shown and described, including all alternatives, modifications, and equivalents, whether or not explicitly illustrated and/or described, without departing from the scope of the present disclosure. In various alternate embodiments, additional devices, or combinations of illustrated devices, may be added to, or combined, without limiting the scope to the embodiments disclosed herein.

Exemplary Video Encoding/Decoding System

FIG. 1 illustrates an exemplary video encoding/decoding system 100 in accordance with at least one embodiment. Encoding device 200 (illustrated in FIG. 2 and described below) and decoding device 300 (illustrated in FIG. 3 and described below) are in data communication with a network 104. Decoding device 200 may be in data communication with unencoded video source 108, either through a direct data connection such as a storage area network ("SAN"), a high speed serial bus, and/or via other suitable communication technology, or via network 104 (as indicated by dashed lines in FIG. 1). Similarly, encoding device 300 may be in data communication with an optional encoded video source 112, either through a direct data connection, such as a storage area network ("SAN"), a high speed serial bus, and/or via other suitable communication technology, or via network 104 (as indicated by dashed lines in FIG. 1). In some embodiments, encoding device 200, decoding device 300, encoded-video source 112, and/or unencoded-video source 108 may comprise one or more replicated and/or distributed physical or logical devices. In many embodiments, there may be more encoding devices 200, decoding devices 300, unencoded-video sources 108, and/or encoded-video sources 112 than are illustrated.

In various embodiments, encoding device 200, may be a networked computing device generally capable of accepting requests over network 104, e.g. from decoding device 300, and providing responses accordingly. In various embodiments, decoding device 300 may be a networked computing device having a form factor such as a mobile-phone; watch, heads-up display, or other wearable computing device; a dedicated media player; a computing tablet; a motor vehicle head unit; an audio-video on demand (AVOD) system; a dedicated media console; a gaming device; a "set-top box;" a digital video recorder; a television; or a general purpose computer. In various embodiments, network 104 may include the Internet, one or more local area networks ("LANs"), one or more wide area networks ("WANs"), cellular data networks, and/or other data networks. Network 104 may, at various points, be a wired and/or wireless network.

Exemplary Encoding Device

Figure 2:
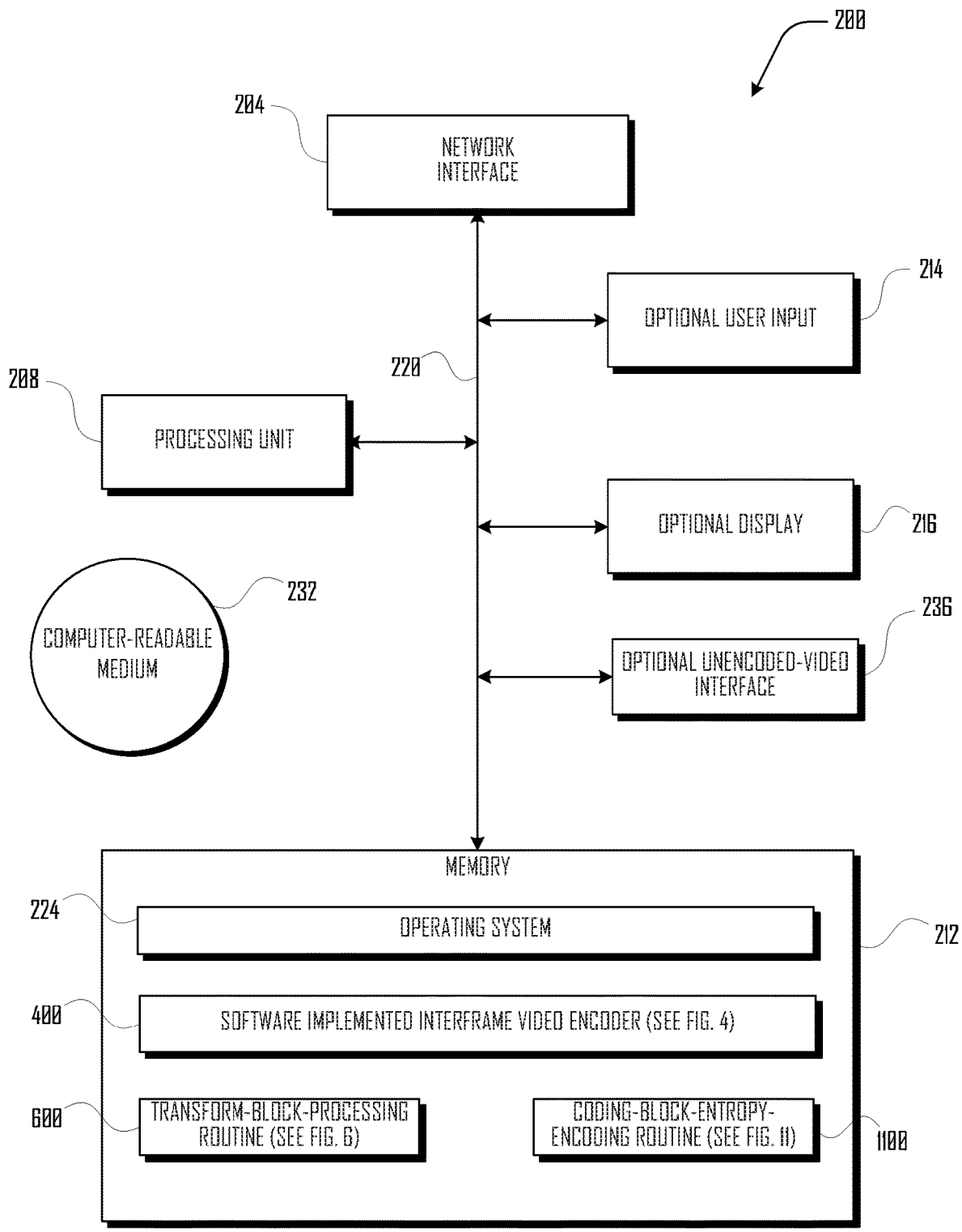
FIG. 2 illustrates several components of an exemplary encoding device, in accordance with one embodiment.

Referring to FIG. 2, several components of an exemplary encoding device 200 are illustrated. In some embodiments, an encoding device may include many more components than those shown in FIG. 2. However, it is not necessary that all of these generally conventional components be shown in order to disclose an illustrative embodiment. As shown in FIG. 2, exemplary encoding device 200 includes a network interface 204 for connecting to a network, such as network 104. Exemplary encoding device 200 also includes a processing unit 208, a memory 212, an optional user input 214 (e.g. an alphanumeric keyboard, keypad, a mouse or other pointing device, a touchscreen, and/or a microphone), and an optional display 216, all interconnected along with the network interface 204 via a bus 220. The memory 212 generally comprises a RAM, a ROM, and a permanent mass storage device, such as a disk drive, flash memory, or the like.

The memory 212 of exemplary encoding device 200 stores an operating system 224 as well as program code for a number of software services, such as software implemented interframe video encoder 400 (described below in reference to FIG. 4) with instructions for performing a transform-block-processing routine 600 (described below in reference to FIG. 6) and/or a coding block entropy encoding routine 1100 (described below in reference to FIG. 11). Memory 212 may also store video data files (not shown) which may represent unencoded copies of audio/visual media works, such as, by way of examples, movies and/or television episodes. These and other software components may be loaded into memory 212 of encoding device 200 using a drive mechanism (not shown) associated with a non-transitory computer-readable medium 232, such as a floppy disc, tape, DVD/CD-ROM drive, USB drive, memory card, or the like.

In operation, the operating system 224 manages the hardware and other software resources of the encoding device 200 and provides common services for software applications, such as software implemented interframe video encoder 400. For hardware functions such as network communications via network interface 204, receiving data via input 214, outputting data via optional display 216, and allocation of memory 212 for various software applications, such as software implemented interframe video encoder 400, operating system 224 acts as an intermediary between software executing on the encoding device and the hardware.

In some embodiments, encoding device 200 may further comprise a specialized unencoded video interface 236 for communicating with unencoded-video source 108, such as a high speed serial bus, or the like. In some embodiments, encoding device 200 may communicate with unencoded-video source 108 via network interface 204. In other embodiments, unencoded-video source 108 may reside in memory 212 or computer readable medium 232.

Although an exemplary encoding device 200 has been described that generally conforms to conventional general purpose computing devices, an encoding device 200 may be any of a great number of devices capable of executing instructions for encoding video in accordance with various embodiments, such as exemplary software implemented video encoder 400, and transform-block-processing routine 600, for example, a video recording device, a video co-processor and/or accelerator, a personal computer, a game console, a set-top box, a handheld or wearable computing device, a smart phone, or any other suitable device.

Encoding device 200 may, by way of example, be operated in furtherance of an on-demand media service (not shown). In at least one exemplary embodiment, the on-demand media service may be operating encoding device 200 in furtherance of an online on-demand media store providing digital copies of media works, such as video content, to users on a per-work and/or subscription basis. The on-demand media service may obtain digital copies of such media works from unencoded video source 108.

Exemplary Decoding Device

Figure 3:
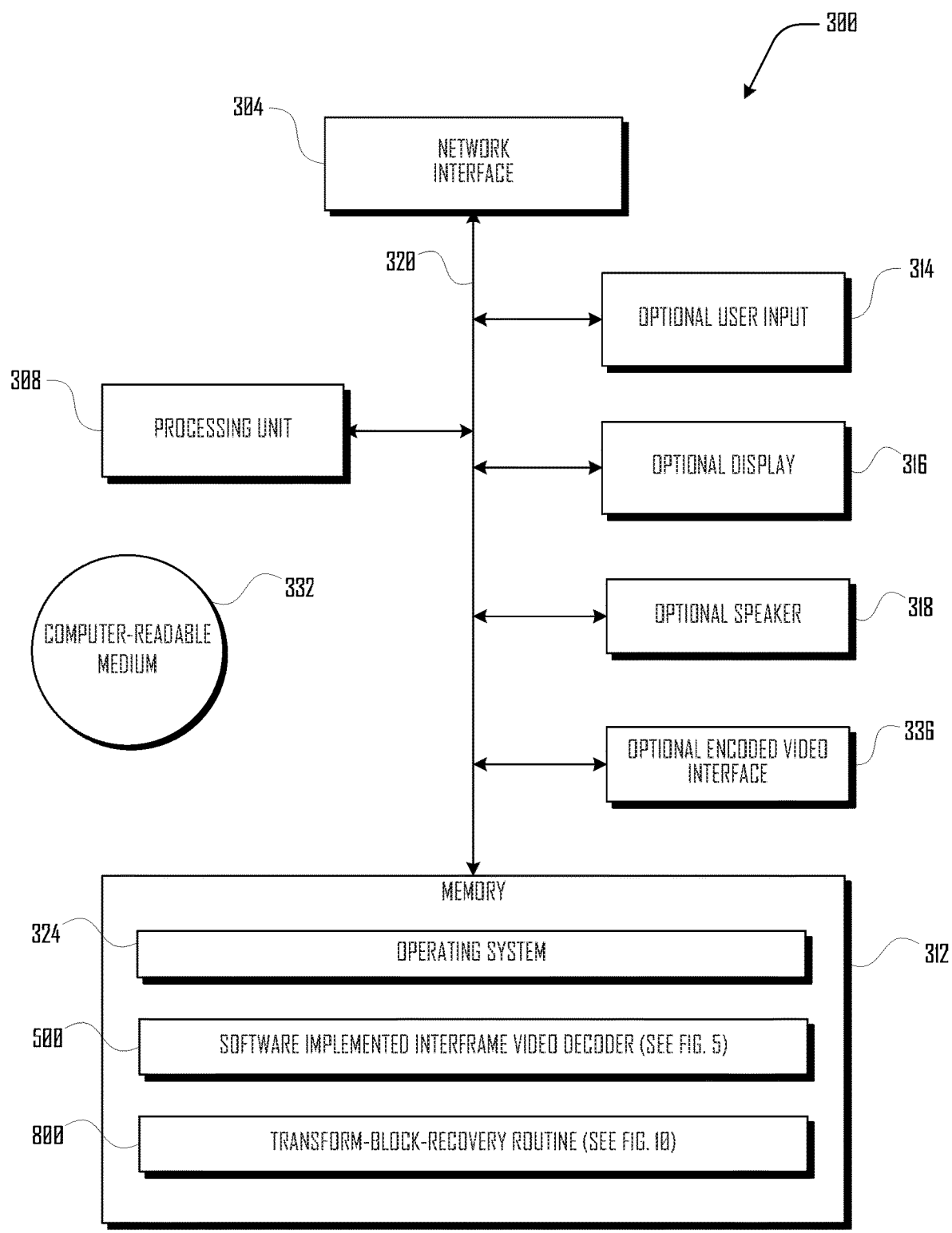
FIG. 3 illustrates several components of an exemplary decoding device, in accordance with one embodiment.

Referring to FIG. 3, several components of an exemplary decoding device 300 are illustrated. In some embodiments, a decoding device may include many more components than those shown in FIG. 3. However, it is not necessary that all of these generally conventional components be shown in order to disclose an illustrative embodiment. As shown in FIG. 3, exemplary decoding device 300 includes a network interface 304 for connecting to a network, such as network 104. Exemplary decoding device 300 also includes a processing unit 308, a memory 312, an optional user input 314 (e.g. an alphanumeric keyboard, keypad, a mouse or other pointing device, a touchscreen, and/or a microphone), an optional display 316, and an optional speaker 318, all interconnected along with the network interface 304 via a bus 320. The memory 312 generally comprises a RAM, a ROM, and a permanent mass storage device, such as a disk drive, flash memory, or the like.

Figure 10:
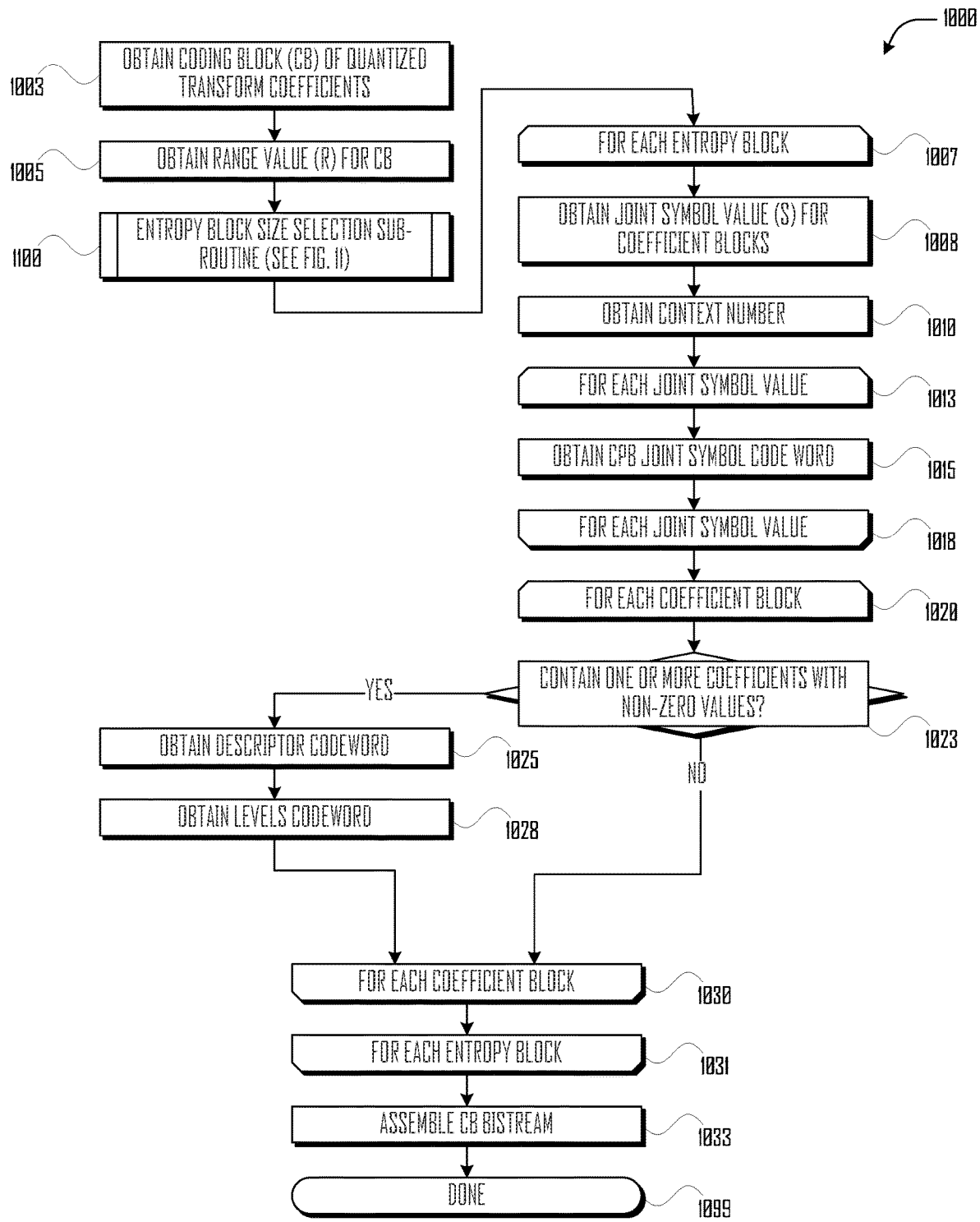
FIG. 10 illustrates a coding block entropy encoding routine in accordance with at least one embodiment.

The memory 312 of exemplary decoding device 300 may store an operating system 324 as well as program code for a number of software services, such as software implemented video decoder 500 (described below in reference to FIG. 5) with instructions for performing a transform-block-recovery routine 1000 (described below in reference to FIG. 10). Memory 312 may also store video data files (not shown) which may represent encoded copies of audio/visual media works, such as, by way of example, movies and/or television episodes. These and other software components may be loaded into memory 312 of decoding device 300 using a drive mechanism (not shown) associated with a non-transitory computer-readable medium 332, such as a floppy disc, tape, DVD/CD-ROM drive, memory card, or the like.

In operation, the operating system 324 manages the hardware and other software resources of the decoding device 300 and provides common services for software applications, such as software implemented video decoder 500. For hardware functions such as network communications via network interface 304, receiving data via input 314, outputting data via optional display 316 and/or optional speaker 318, and allocation of memory 312, operating system 324 acts as an intermediary between software executing on the encoding device and the hardware.

In some embodiments, decoding device 300 may further comprise a optional encoded video interface 336, e.g. for communicating with encoded-video source 116, such as a high speed serial bus, or the like. In some embodiments, decoding device 300 may communicate with an encoded-video source, such as encoded video source 116, via network interface 304. In other embodiments, encoded-video source 116 may reside in memory 312 or computer readable medium 332.

Although an exemplary decoding device 300 has been described that generally conforms to conventional general purpose computing devices, an decoding device 300 may be any of a great number of devices capable of executing instructions for decoding video in accordance with various embodiments, such as exemplary software implemented video decoder 500, and transform-block-recovery routine 1000, for example, a video recording device, a video co-processor and/or accelerator, a personal computer, a game console, a set-top box, a handheld or wearable computing device, a smart phone, or any other suitable device.

Decoding device 300 may, by way of example, be operated in cooperation with the on-demand media service. In at least one exemplary embodiment, the on-demand media service may provide digital copies of media works, such as video content, to a user operating decoding device 300 on a per-work and/or subscription basis. The decoding device may obtain digital copies of such media works from unencoded video source 108 via, for example, encoding device 200 via network 104.

Software Implemented Video Encoder

Figure 4:
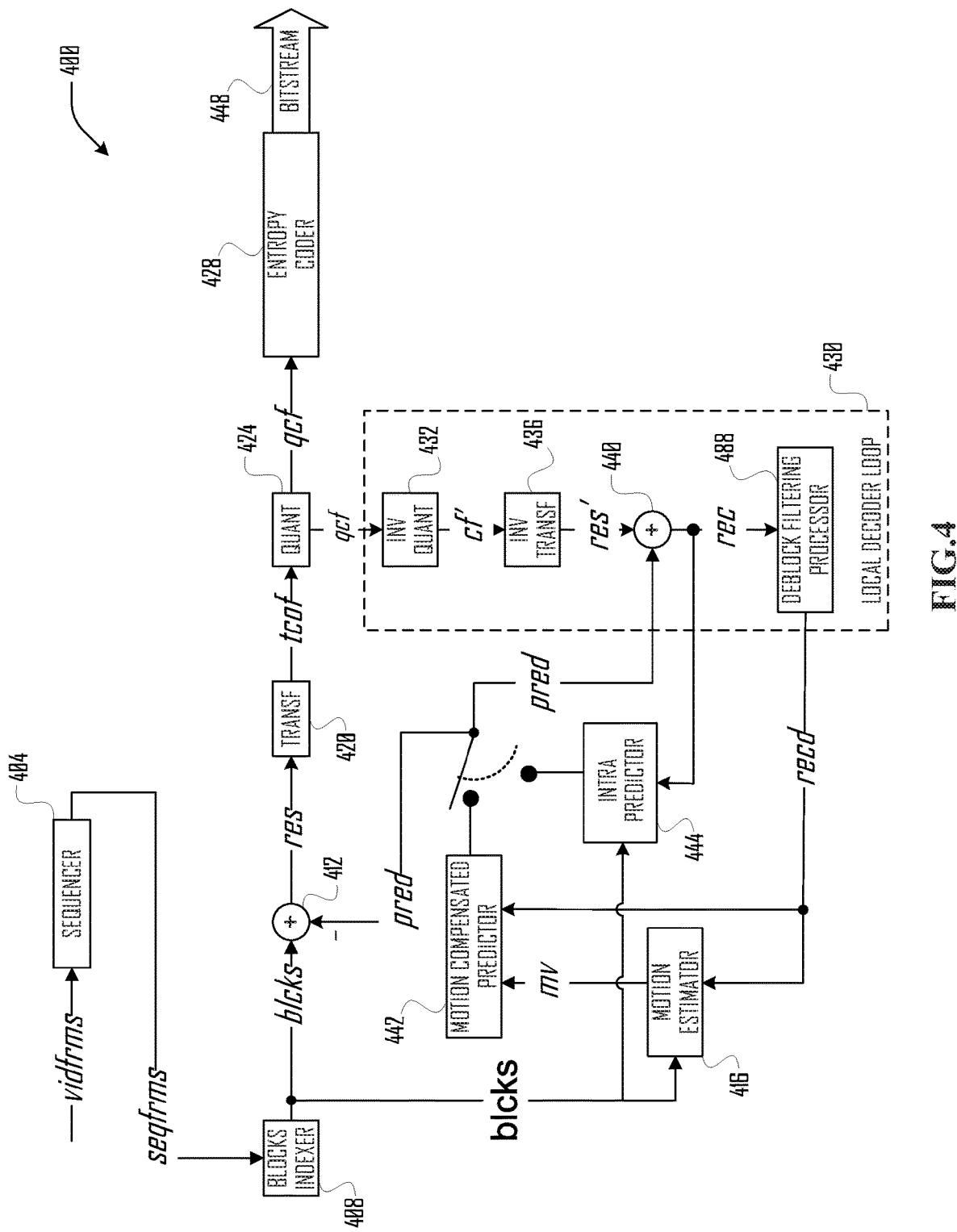
FIG. 4 illustrates a block diagram of an exemplary video encoder in accordance with at least one embodiment.

FIG. 4 shows a general functional block diagram of software implemented interframe video encoder 400 (hereafter "encoder 400") employing residual transformation techniques in accordance with at least one embodiment. One or more unencoded video frames (vidfrms) of a video sequence in display order may be provided to sequencer 404.

Sequencer 404 may assign a predictive-coding picture-type (e.g. I, P, or B) to each unencoded video frame and reorder the sequence of frames, or groups of frames from the sequence of frames, into a coding order for motion prediction purposes (e.g. I-type frames followed by P-type frames, followed by B-type frames). The sequenced unencoded video frames (seqfrms) may then be input in coding order to blocks indexer 408.

For each of the sequenced unencoded video frames (seqfrms), blocks indexer 408 may determine a largest coding block ("LCB") size for the current frame (e.g. sixty-four by sixty-four pixels) and divide the unencoded frame into an array of coding blocks (blks). Individual coding blocks within a given frame may vary in size, e.g. from four by four pixels up to the LCB size for the current frame.

Each coding block may then be input one at a time to differencer 412 and may be differenced with corresponding prediction signal blocks (pred) generated from previously encoded coding blocks. To generate the prediction blocks (pred), coding blocks (cblks) are also be provided to an intra-predictor 414 and a motion estimator 416. After differencing at differencer 412, a resulting residual block (res) may be forward-transformed to a frequency-domain representation by transformer 420 (discussed below), resulting in a block of transform coefficients (tcof). The block of transform coefficients (tcof) may then be sent to the quantizer 424 resulting in a block of quantized coefficients (qcf) that may then be sent both to an entropy coder 428 and to a local decoding loop 430.

For intra-coded coding blocks, intra-predictor 414 provides a prediction signal representing a previously coded area of the same frame as the current coding block. For an inter-coded coding block, motion compensated predictor 442 provides a prediction signal representing a previously coded area of a different frame from the current coding block.

At the beginning of local decoding loop 430, inverse quantizer 432 may de-quantize the block of transform coefficients (tcof') and pass them to inverse transformer 436 to generate a de-quantized residual block (res'). At adder 440, a prediction block (pred) from motion compensated predictor 442 may be added to the de-quantized residual block (res') to generate a locally decoded block (rec). Locally decoded block (rec) may then be sent to a frame assembler and deblock filter processor 444, which reduces blockiness and assembles a recovered frame (recd), which may be used as the reference frame for motion estimator 416 and motion compensated predictor 442.

Entropy coder 428 encodes the quantized transform coefficients (qcf), differential motion vectors (dmv), and other data, generating an encoded video bit-stream 448. For each frame of the unencoded video sequence, encoded video bit-stream 448 may include encoded picture data (e.g. the encoded quantized transform coefficients (qcf) and differential motion vectors (dmv)) and an encoded frame header (e.g. syntax information such as the LCB size for the current frame).

Forward Integer Transform Procedures

Referring to the functionality of transformer 420, the transformer receives a block of residual values for each coding block's luma and chroma values and divides the block of residual values into one or more luma and chroma transform blocks.

In at least one embodiment, a coding block is divided into transform blocks sized according to the current coding block size as well as the size of the prediction block(s) used for motion estimation for the coding block. At least one exemplary technique for selecting the size of transform blocks is described below in reference to FIG. 8. Transformer 420 may also set a maximum-transform-block-size flag in the picture header for the current frame.

After a coding block is divided into transform blocks, the residual values in the transform blocks are converted from the spatial domain to the frequency domain, for example via a forward DCT transform operation. In at least one embodiment, in order to increase coding efficiency, integer equivalents of the transform block's residual values are obtained and a forward integer DCT transform operation may be performed. In order to further increase coding efficiency, it may be advantageous to utilize a single-instruction-multiple-data (SIMD) instruction architecture in the video coding process. However, most common implementations of SIMD instruction architecture require a bit-width of sixteen bits. Therefore, in at least one embodiment, bit-shifting operations may be performed on the residual values after some forward transformation operations (and, on the decoder side, on the transform coefficients after some inverse transformation operations) to ensure the residual values and transform coefficients may be represented by sixteen bit integers.

In many applications there may be a substantial number of transform blocks be composed of all zero coefficients (e.g., the more accurate the motion prediction for inter-coded blocks, the lower the residual value between the coding block and the predication block should be). In certain embodiments, a one bit transform block pattern (TBP) flag for each transform block header in the coding block header may be used to indicate the transform block's coefficient status, i.e. either all zeros or not all zeros. The TBP flags in each coding block header may, for example, follow raster-scan order. In some embodiments, a TBP flag may be set for all transform blocks in a picture. In other embodiments, a TBP flag may be set under narrower conditions. For example, in certain embodiments a TBP flag may only be set when the transform blocks of the current coding block equal the maximum possible transform block size.

Entropy Encoding Procedure

Referring to the functionality of entropy coder 428, for each coding block the entropy encoder may obtain a number of quantized transform coefficients (qcf) representing the coding block's luma and chroma values. In certain embodiments, the quantized transform coefficients in each coding block may be grouped as several entropy blocks (EB). Entropy block size may be equal or less than the maximum possible transform block size. For example, such as in the embodiment described below with reference to FIG. 14, if the coding block size is 8×8, the entropy block size may be set to 8×8; if the coding block size is larger than 8×8, the entropy block size may be set to 16×16.

Figure 5A:
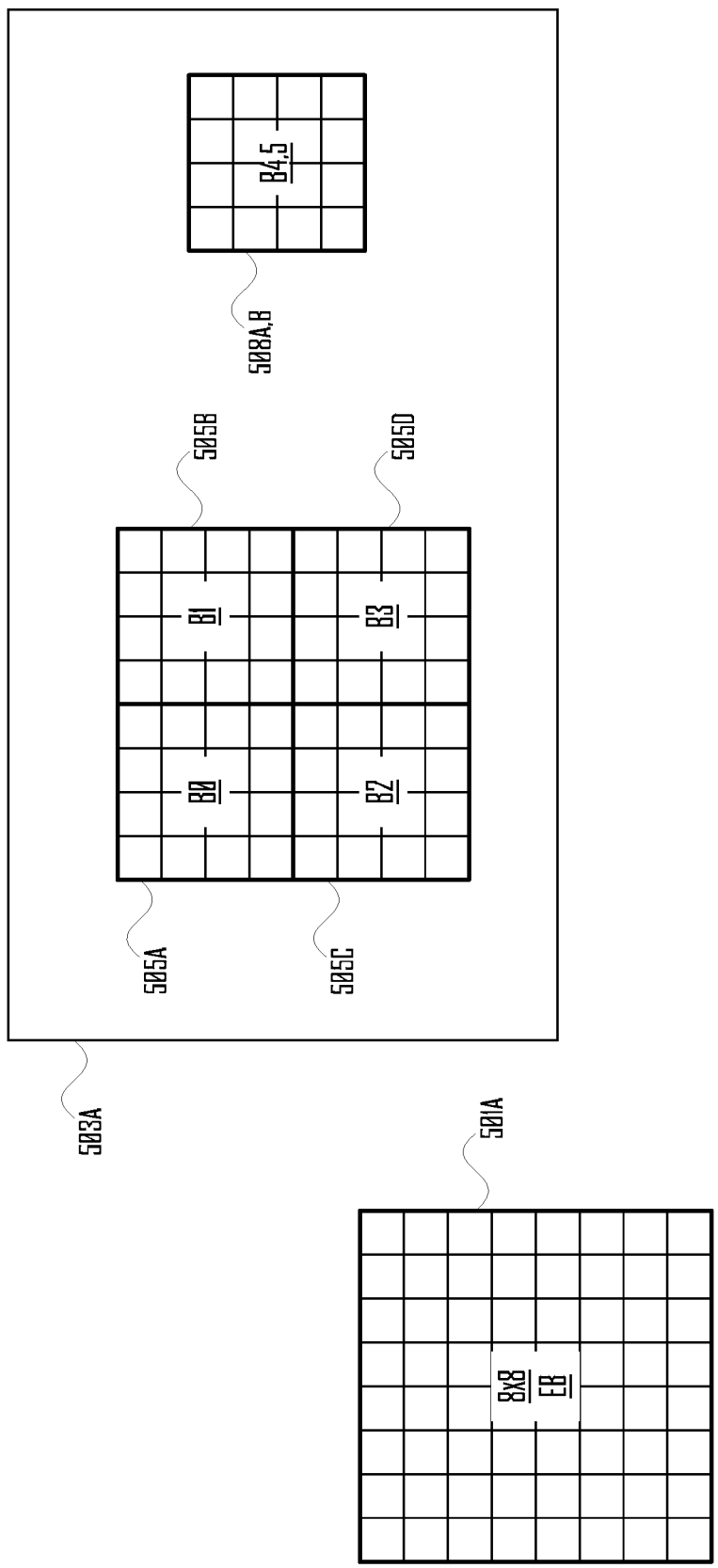
FIGS. 5a-b are block diagram illustrations showing the relationship between entropy block size and associated coefficient block size in accordance with at least one embodiment.
Figure 5B:
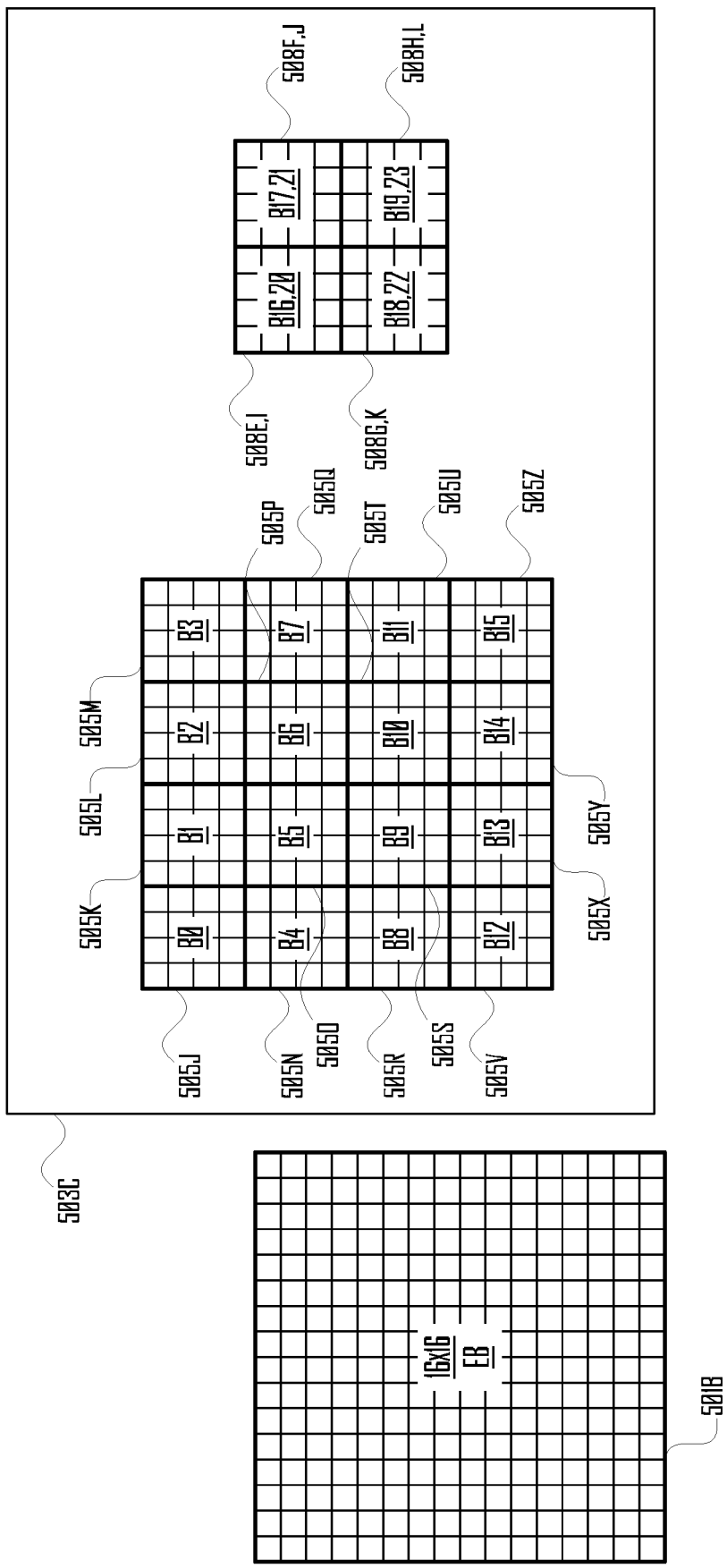

Referring to FIGS. 5a-b by way of example:

(A) for an 8×8 entropy block 501A, there are four 4×4 luma coefficient blocks 505A-D representing the entropy block's luminance values and two 4×4 chroma coefficient blocks 508A,B representing the entropy block's two chrominance values; and (B) for a 16×16 entropy block 501B, there are twenty four coefficient blocks, including sixteen 4×4 luma coefficient blocks 505J-Z, representing the coding block's luminance values and eight 4×4 chroma coefficient blocks 508E-L, representing the entropy block's two chrominance values.

There may be a non-negligible number of coefficient blocks with all zero value coefficients and it may therefore be advantageous to only encode and transmit those coefficient blocks containing one or more non-zero value. In accordance with at least one embodiment, a coefficient block pattern (CBP) flag (B) for each coefficient block (i) may be used to indicate each coefficient block's status, i.e. either all zeros or not all zeros, to a decoder. The CBP flag ($B_i$) for each coefficient block in a coding block may be coded in the entropy block header. However, if one bit is used to signal the CBP flag for each coefficient block, a relatively large number of bits may be needed to encode the CBP flags over an entire frame. Therefore, in accordance with various embodiments, a context-adaptive, variable length coding technique may be applied to the CBP flags for each entropy block.

For a entropy block having a number (N) of coefficient blocks, the N CBP flags ($B_{0,1,\ldots N-1}$), may be grouped into one or more joint symbols (S). In at least one embodiment, a joint symbol (S) may be ordered such that the CBP flags associated with the entropy blocks representing the chroma coefficient blocks are placed in front of the CBP flags associated with the entropy blocks representing the luma coefficient blocks. For an 8×8 entropy block, N may equal 6: four 4×4 chroma coefficient blocks and two 4×4 luma coefficient blocks. The six corresponding CBP flags $B_{0-5}$ may be grouped into a single 6 bit joint symbol (S) with the CBP flags for the chroma coefficient blocks first, followed by the CBP flags for the luma coefficient blocks, ordered as shown in FIG. 5a, where:

$$S=B_5,B_4,B_3,B_2,B_1,B_0.$$

For a 16×16 entropy block, N may equal 24: sixteen 4×4 luma coefficient blocks and eight 4×4 chroma coefficient blocks. The twenty four corresponding CBP flags $B_{0-23}$ may be grouped into four 6 bit joint symbols $S_i$, ordered as shown in FIG. 5b, where:

$$S_0=B_{20},B_{16},B_5,B_4,B_1,B_0$$

$$S_1=B_{21},B_{17},B_7,B_6,B_3,B_2$$

$$S_2=B_{22},B_{18},B_{13},B_{12},B_9,B_8$$

$$S_3=B_{23},B_{19},B_{15},B_{14},B_{11},B_{10}.$$

During the coding process, the probability of any particular entropy block pattern occurring will vary depending on prediction mode (e.g. either intra-prediction or inter-prediction) and the transform block size (e.g. 4×4 transform blocks or larger than 4×4 transform blocks). To increase the efficiency of the CBP joint symbol encoding, for each joint symbol S, a context number (ctx) may be derived based on the size of the transform blocks, the prediction mode (i.e. inter/intra prediction), and, in the case of 16×16 entropy blocks, the index number (i) of the joint symbol. For an 8×8 entropy block, the context number may be derived according to:

$$ctx=2*\text{pred\_mode}+\text{trans\_size}.$$

For a 16×16 entropy block, the context number may be derived according to:

$$ctx=4*(2*\text{pred\_mode}+\text{trans\_size}-1)+i.$$

Where,
   pred_mode=0 for an intra-coded coding block and 1 for an inter-coded coding block, and
   trans_size=0 for a 4×4 transform block and 1 for a larger transform block.

Thus, for 8×8 entropy blocks, the context number may equal zero to three, as is shown in Table 3, and, for 16×16 intra-coded transform blocks, the context number for joint symbol $S_0$ may equal zero to eleven, as is shown in Table 4.

The joint symbol value(s) may then be mapped to a Huffman code length table, selected based on the quantization range of the current coding block and the derived context number, containing the $2^N$ possible values of the joint symbol S, e.g 64 in the current exemplary embodiment, and a corresponding Huffman code length (HCL) for current joint symbol may be obtained. A Huffman code is derived according to the HCL value to represent the join symbol.

In some embodiments, a $2^K$-bit symbol may be used to represent the Huffman code length. For example, there may be sixteen possible values for the Huffman code length (0-15) when K=2. Since there are $2^N$ possible joint symbol values and each joint symbol value maps to a Huffman code length, $2^{N+K}$ bits may be required for one Huffman code length table. In some implementation, these $2^{N+K}$ bits can be further represented by an array which consists of $2^m$-bit elements. Therefore, the array dimension, e.g. the number of elements, of a Huffman code length table is $2^{N+K-M}$.

In accordance with at least the present embodiment, there are sixty four (N=6) possible joint symbol values and one joint symbol is mapped to a four (K=2) bit Huffman code length, two hundred and fifty six ($2^{6+2}$) bits may be required for one Huffman code length table. In embodiments consistent with a C/C++ implementation, one Huffman code length table can be further represented by an array with 32-bit (M=5) elements, e.g. unsigned integers, and thus the number of elements in the array is eight ($2^{N+K-M}=2^{6+2-5}$). In such embodiments, three-dimensional tables may be used to represent all possible Huffman code length tables for one CBP joint symbol, the three dimensions being:
   QR: one of seven quantization ranges previously used in quantizing the coding block;
   ctx: context value of the entropy block, described above; and
   S: one of the sixty four possible CBP joint symbol values S.

In embodiments consistent with a C/C++ implementation, S may be represented by an unsigned integer variable and thus the number of elements in the last dimension may be 8.

TABLE 3

| Predictive Coding Type | Transform Block Size | Context Number |
|---|---|---|
| Intra-Coded | 4 × 4 | 0 |
|  | Larger than 4 × 4 | 1 |
| Inter-Coded | 4 × 4 | 2 |
|  | Larger than 4 × 4 | 3 |

TABLE 4

| Predictive Coding Type | Transform Block Size | Coefficient Block Set | Context Number |
|---|---|---|---|
| Intra-Coded | Larger than 4 × 4 | 0 | 0 |
|  |  | 1 | 1 |
|  |  | 2 | 2 |
|  |  | 3 | 3 |
| Inter-Coded | 4 × 4 | 0 | 4 |
|  |  | 1 | 5 |
|  |  | 2 | 6 |
|  |  | 3 | 7 |
|  | Larger than 4 × 4 | 0 | 8 |
|  |  | 1 | 9 |
|  |  | 2 | 10 |
|  |  | 3 | 11 |

After the CBP joint symbol code words for the entropy block have been determined, entropy encoder 428 may encode any coefficient blocks containing one or more non-zero quantized transform coefficient s. For each non-zero value coefficient block, two parameters are used to describe the quantized transform coefficients: descriptors and levels. A descriptor may be a representation of the coefficient distribution in the coefficient block and the level may represent the coefficient magnitude. A Huffman code length table for a coefficient block's descriptor is selected depending on five criteria: prediction mode (intra/inter), coefficient block size (4×4 or 2×2), quantization range (QR), context number (ctx), and the descriptor value (D). A Huffman code length table for a coefficient block's level is selected depending on three criteria: prediction mode (intra/inter), quantization range (QR), and level value (L).

After the descriptor and level code words for the non-zero coefficient blocks have been determined, entropy encoder 428 may assemble a bitstream. The bitstream may include at least a coding block header including the CBP flag code word(s), the descriptor code words, and the level code words.

Software Implemented Interframe Decoder

Figure 6:
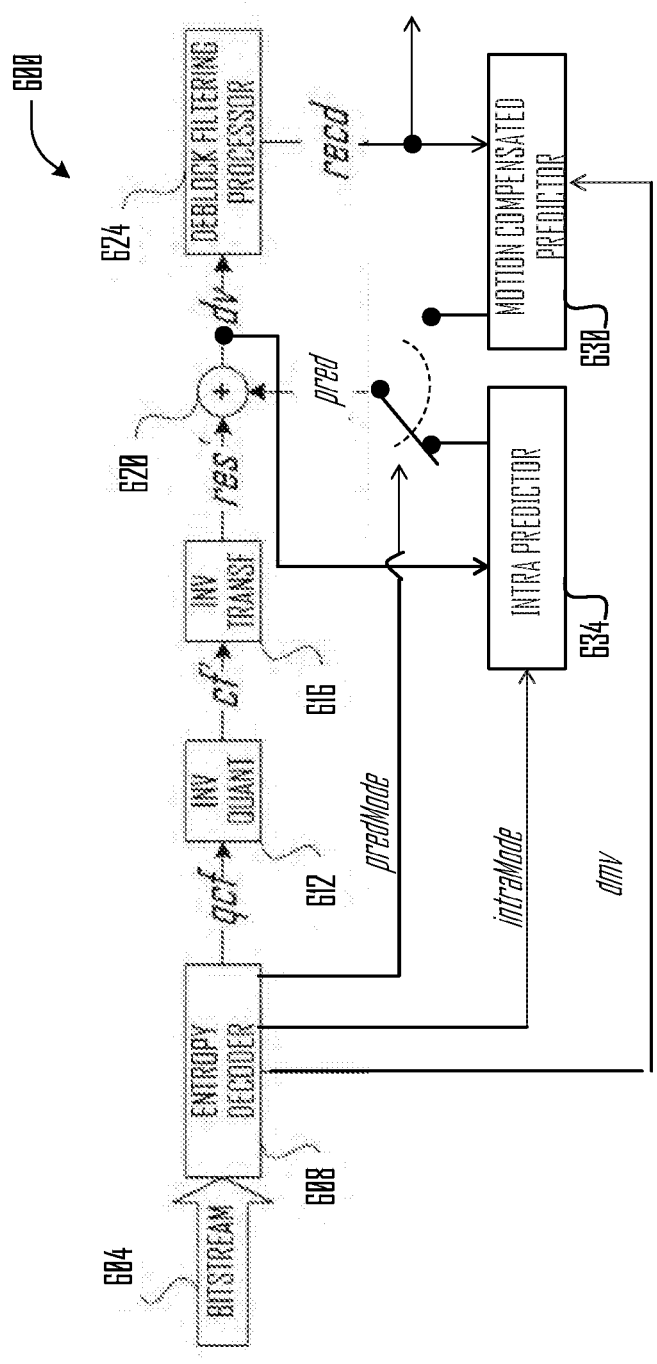
FIG. 6 illustrates a block diagram of an exemplary video decoder in accordance with at least one embodiment.

FIG. 6 shows a general functional block diagram of a corresponding software implemented interframe video decoder 600 (hereafter "decoder 600") inverse residual transformation techniques in accordance with at least one embodiment and being suitable for use with a decoding device, such as decoding device 300. Decoder 600 may work similarly to the local decoding loop 455 at encoder 400.

Specifically, an encoded video bit-stream 604 to be decoded may be provided to an entropy decoder 608, which may decode blocks of quantized coefficients (qcf), differential motion vectors (dmv), accompanying message data packets (msg-data), and other data, including the prediction mode (intra or inter). The quantized coefficient blocks (qcf) may then be reorganized by an inverse quantizer 612, resulting in recovered transform coefficient blocks (tcof). Recovered transform coefficient blocks (tcof) may then be inverse transformed out of the frequency-domain by an inverse transformer 616 (described below), resulting in decoded residual blocks (res). An adder 620 may add motion compensated prediction blocks (psb) obtained by using corresponding motion vectors (dmv) from a motion compensated predictor 628. The resulting decoded video (dv) may be deblock-filtered in a frame assembler and deblock filtering processor 624. Blocks (recd) at the output of frame assembler and deblock filtering processor 624 form a reconstructed frame of the video sequence, which may be output from the decoder 600 and also may be used as the reference frame for a motion-compensated predictor 628 for decoding subsequent coding blocks.

Transform-Block-Processing-Routine

Figure 7:
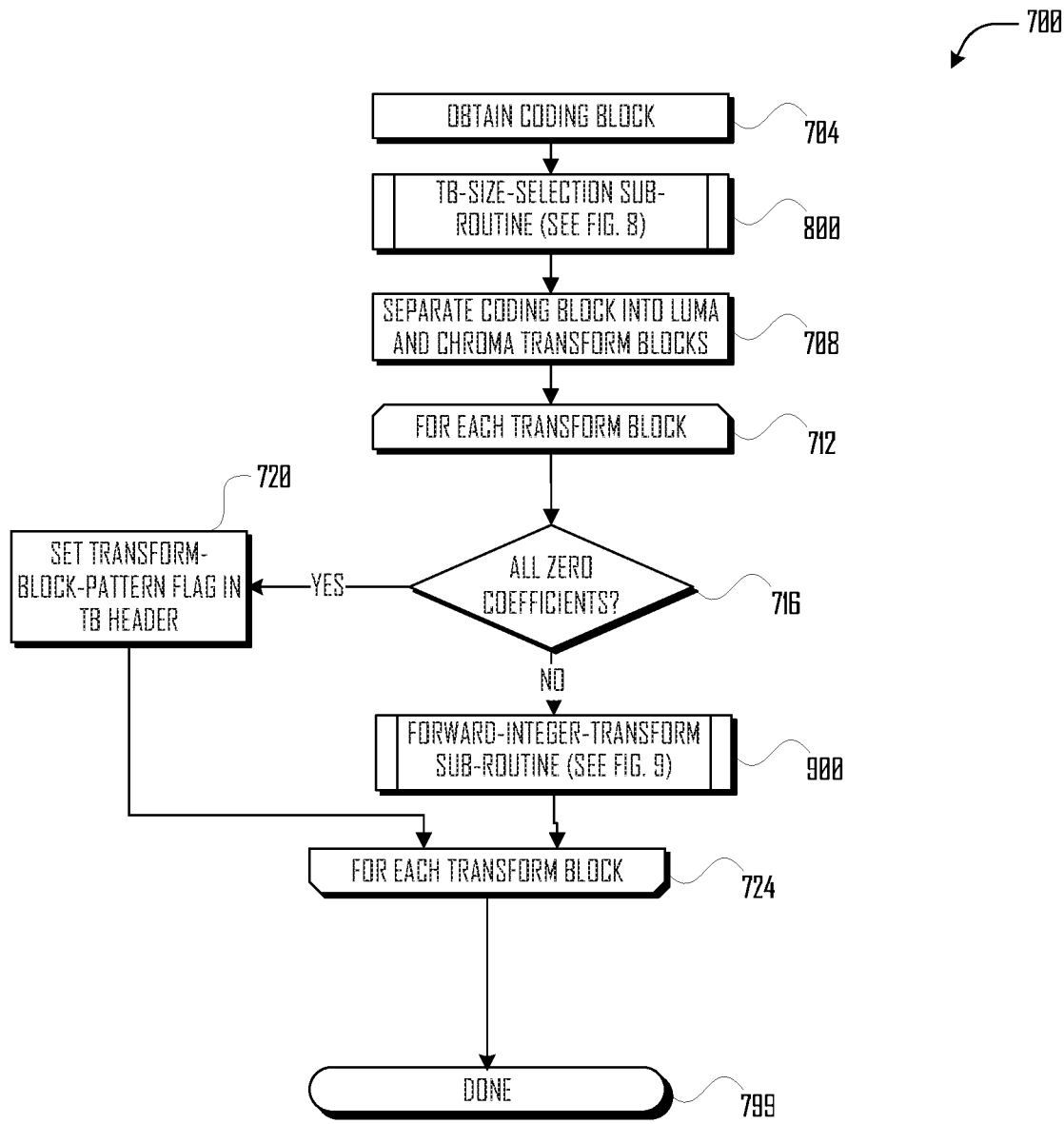
FIG. 7 illustrates a transform-block-processing routine in accordance with at least one embodiment.

FIG. 7 illustrates a transform-block-processing routine 700 suitable for use with at least one embodiment, such as encoder 400. As will be recognized by those having ordinary skill in the art, not all events in the encoding process are illustrated in FIG. 7. Rather, for clarity, only those steps reasonably relevant to describing the illustrated embodiment are shown.

At execution block 704, transform-block-processing routine 700 obtains a coding block of integer residual values for current frame being encoded. Transform-block-processing routine 700 then provides the size of the current coding block and the size of the corresponding prediction blocks used in motion estimation to transform-block-size-selection sub-routine 800 (described below in reference to FIG. 8), which returns appropriate chroma and luma transform block sizes for the current combination of current coding block size and prediction block size.

At execution block 708, transform-block-processing routine 700 then separates the current coding block into one or more transform blocks of sixteen-bit integer residual values according to the chroma and luma transform block sizes returned by transform-block-size-selection sub-routine 700, above.

At starting loop block 712, each transform block of the current coding block is processed in turn.

At decision block 716, if each of the residual values of the current transform block has a zero value, then at execution block 720, transform-block-processing routine 700 sets a corresponding transform-block-pattern flag in the transform block header of the current transform block.

Otherwise, at decision block 716, if one or more of the residual values of the current transform block has a non-zero value, then transform-block-processing routine 700 calls forward-integer-transform sub-routine 900 (described below in reference to FIG. 9), which returns a corresponding block of sixteen-bit integer transform coefficients.

At ending loop block 724, transform-block-processing routine 700 iterates back to starting loop block 712 to process the next transform block of the current coding block (if any).

Transform-block-processing routine 700 ends for the current coding block at termination block 799.

Transform-Block-Size-Selection Sub-Routine

Figure 8:
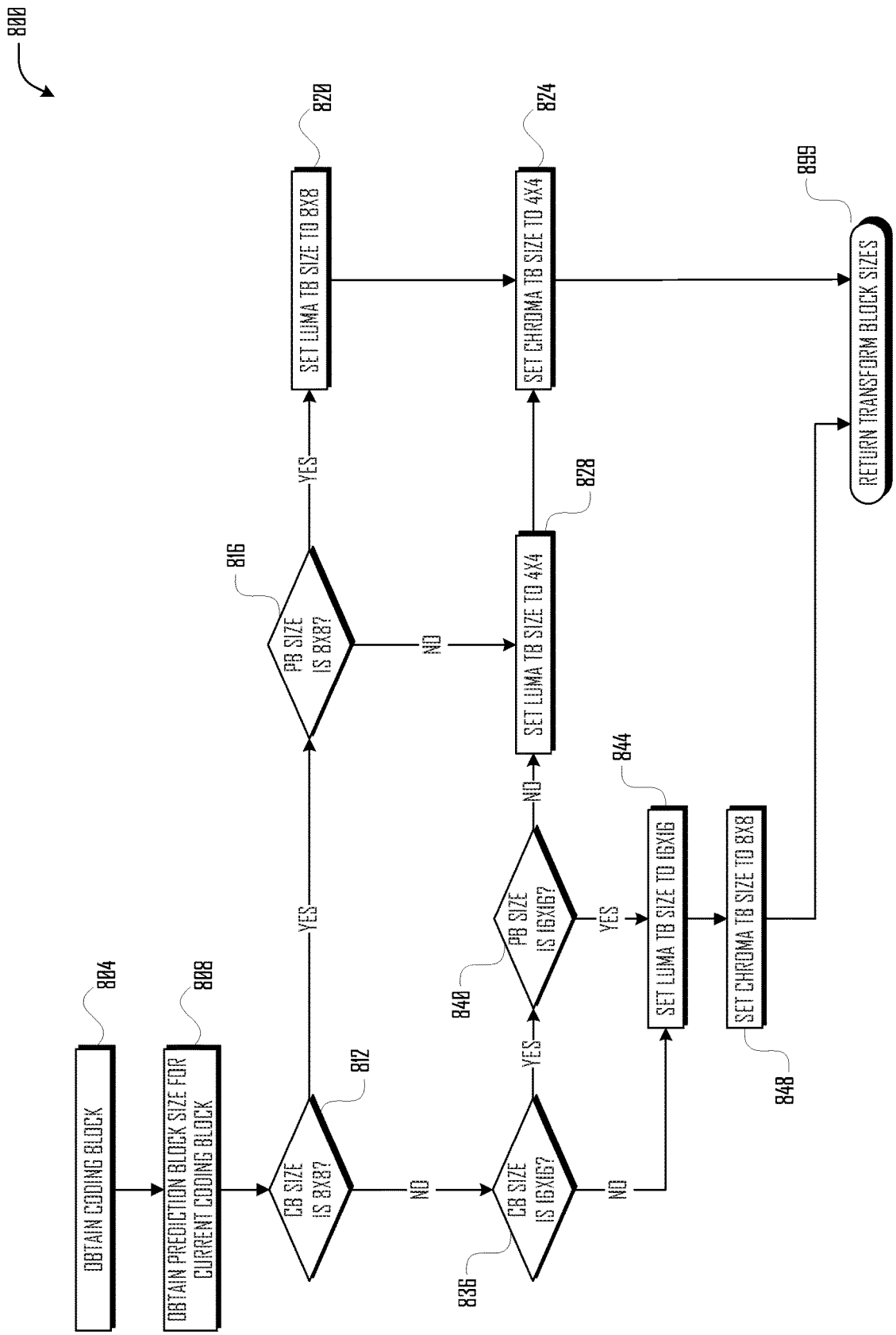
FIG. 8 illustrates a transform-block-size-selection sub-routine in accordance with at least one embodiment.

FIG. 8 illustrates a transform-block-size-selection sub-routine 800 suitable for use with at least one embodiment, such as transform-block-processing routine 700.

At execution block 804, transform-block-size-determination sub-routine 800 obtains the coding block size and the prediction block size used for the motion estimation process of the current coding block.

At decision block 812, if the coding block size of the current coding block is 8×8 pixels, then transform-block-size-determination sub-routine 800 proceeds to decision block 816.

At decision block 816, if the prediction block size for the current coding block is 8×8 pixels, then at execution block 820, transform-block-size-determination sub-routine 800 sets the luma transform block size for the current coding block to 8×8 luma transform coefficients and, at execution block 824, transform-block-size-determination sub-routine sets the chroma transform block size for the current coding block to 4×4 chroma transform coefficients. Transform-block-size-determination sub-routine then returns the luma transform block size and the chroma transform block size for the current coding block at return block 899.

Referring again to decision block 816, if the prediction block size for the current coding block is not 8×8 pixels, then at execution block 828, transform-block-size-determination sub-routine 800 sets the luma transform block size for the current coding block to 4×4 luma transform coefficients. Transform-block-size-determination sub-routine 800 then proceeds to execution block 824. As described above, at execution block 824, transform-block-size-determination sub-routine sets the chroma transform block size for the current coding block to 4×4 chroma transform coefficients. Transform-block-size-determination sub-routine then returns the luma transform block size and the chroma transform block size for the current coding block at return block 899.

Referring again to decision block 812, if the coding block size for the current coding block is not 8×8 pixels, transform-block-size-determination sub-routine 800 proceeds to decision block 836.

At decision block 836, if the coding block size for the current coding block is 16×16 pixels, then transform-block-size-determination sub-routine 800 proceeds to decision block 840.

At decision block 840, if the prediction block size for the current coding block is 16×16 pixels, then at execution block 844, transform-block-size-determination sub-routine 800 sets the luma transform block size for the current coding block to 16×16 luma transform coefficients, and, at execution block 848, transform-block-size-determination sub-routine then sets the chroma transform block size for the current coding block to 8×8 chroma transform coefficients. Transform-block-size-determination sub-routine then returns the luma transform block size and the chroma transform block size for the current coding block at return block 899.

Referring again to decision block 840, if the prediction block size for the current coding block is not 16×16 pixels, then transform-block-size-determination sub-routine 800 proceeds to execution block 828. As described above, at execution block 828, transform-block-size-determination sub-routine 800 sets the luma transform block size for the current coding block to 4×4 luma transform coefficients. Transform-block-size-determination sub-routine 800 then proceeds to execution block 824. As described above, at execution block 824, transform-block-size-determination sub-routine sets the chroma transform block size for the current coding block to 4×4 chroma transform coefficients. Transform-block-size-determination sub-routine then returns the luma transform block size and the chroma transform block size for the current coding block at return block 899.

Referring again to decision block 836, if the coding block size for the current coding block is not 16×16 pixels, then transform-block-size-determination sub-routine 800 proceeds to execution block 844. As described above, at execution block 844, transform-block-size-determination sub-routine 800 sets the luma transform block size for the current coding block to 16×16 luma transform coefficients, and, at execution block 848, transform-block-size-determination sub-routine then sets the chroma transform block size for the current coding block to 8×8 chroma transform coefficients. Transform-block-size-determination sub-routine then returns the luma transform block size and the chroma transform block size for the current coding block at return block 899.

Forward-Integer-Transform Sub-Routine

Figure 9:
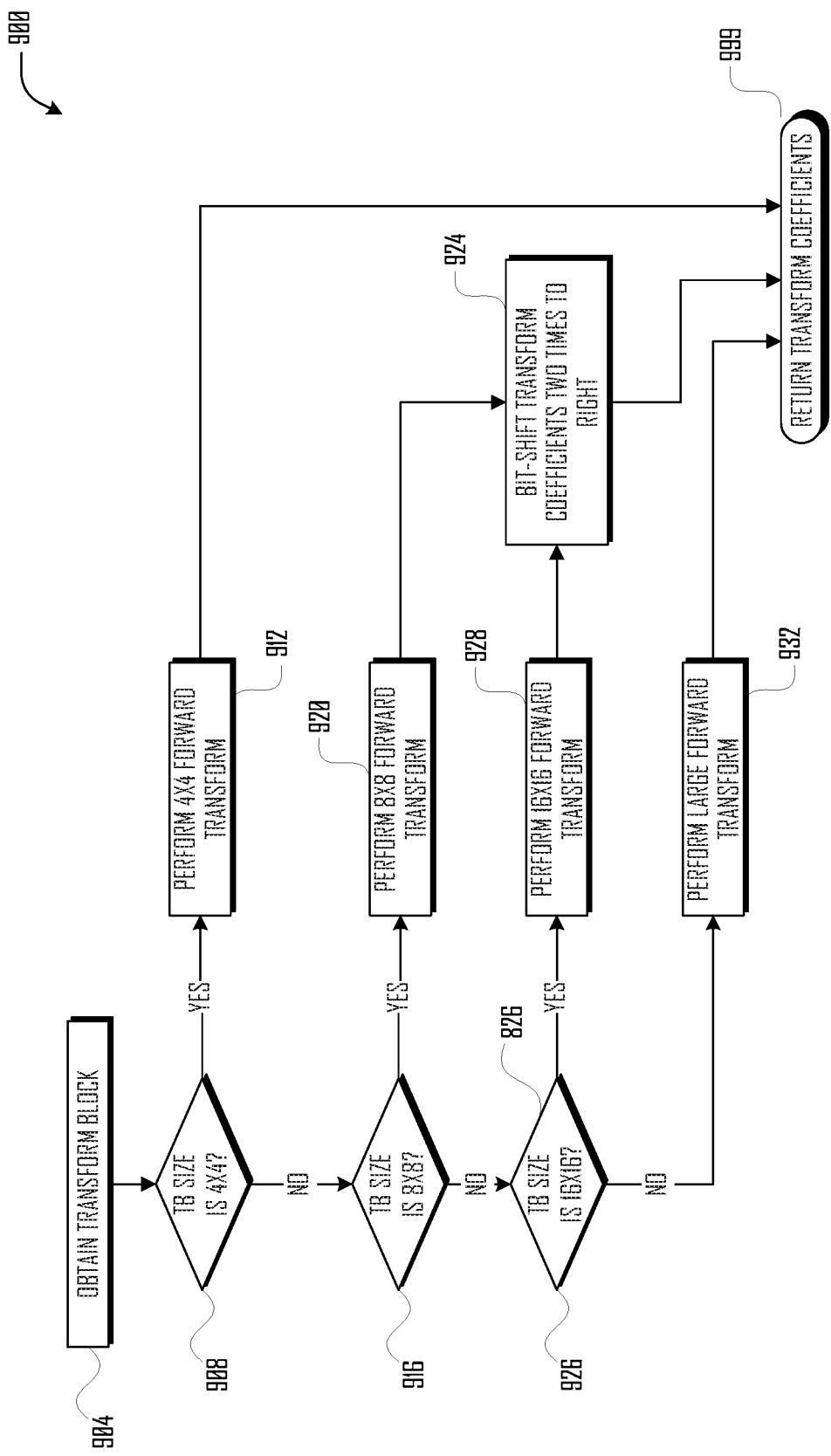
FIG. 9 illustrates a forward-integer-transform sub-routine in accordance with at least one embodiment.

FIG. 9 illustrates a forward-integer-transform sub-routine 900 suitable for use with at least one embodiment, such as transform-block-processing routine 700 or double-transform sub-routine 1000, described below in reference to FIG. 10.

At execution block 904, forward-integer-transform sub-routine obtains a transform block, for example from transform-block-processing routine 600.

At decision block 908, if the current transform block is a 4×4 block of integer transform coefficients, then at execution block 912, forward-integer-transform sub-routine 900 performs a 4×4 forward transform, for example the 4×4 forward integer transform operation described above. Forward-integer-transform sub-routine 900 then returns the transform coefficients obtained via the 4×4 integer transform at return block 999.

Referring again to decision block 908, if the current transform block is not a 4×4 block of integer transform coefficients, for example an 8×8, a 16×16, a 32×32, or a 64×64 block of integer transform coefficients, then forward-integer-transform sub-routine 900 proceeds to decision block 916.

At decision block 916, if the current transform block is an 8×8 block of integer transform coefficients, then at execution block 920, forward-integer-transform sub-routine 900 performs an 8×8 forward transform, for example the 8×8 forward integer transform operation described above. At execution block 924, forward-integer-transform sub-routine 900 manipulates the transform coefficients obtained via the 8×8 integer transform at execution block 920, bit-shifting the transform coefficients twice to the right in order to ensure the transform coefficients may be represented by no more than sixteen bits. Forward-integer-transform sub-routine 900 returns the bit-shifted transform coefficients at return block 999.

Referring again to decision block 916, if the current transform block is not an 8×8 block of integer transform coefficients (for example, if it is a 16×16, a 32×32 or 64×64 block of integer transform coefficients), then forward-integer-transform sub-routine 900 proceeds to decision block 926.

At decision block 926, if the current transform block is a 16×16 block of integer transform coefficients, then at execution block 928, forward-integer-transform sub-routine 900 performs a 16×16 forward transform, for example the 16×16 forward integer transform operation described above. Forward-integer-transform sub-routine 900 then proceeds to execution block 924. As described above, at execution block 924, forward-integer-transform sub-routine 900 manipulates the transform coefficients obtained via the 8×8 integer transform at execution block 920, bit-shifting the transform coefficients twice to the right in order to ensure the transform coefficients may be represented by no more than sixteen bits. Forward-integer-transform sub-routine 900 returns the bit-shifted transform coefficients at return block 999.

Referring again to decision block 926, if the current transform block is larger than a 16×16 block of integer transform coefficients, for example a 32×32 or 64×64 block of integer transform coefficients, then at execution block 932, forward-integer-transform sub-routine 900 performs a large-transform procedure. Forward-integer-transform sub-routine 900 returns the results of the large integer transform procedure at return block 999.

Coding Block Entropy Encoding Routine

Entropy encoding routine 1000 obtains a coding block at execution block 1003. In at least the present embodiment, the coding block may be an 8×8, 16×16, 32×32, or a 64×64 coding block.

Entropy encoding routine 1000 obtains a value for a quantization range variable (QR) of the coding block at execution block 1005. For example, there may be seven possible values, 0-6, of the quantization range variable QR.

Entropy encoding routine 1000 may provide the size of the current coding block to an entropy block size selection sub-routine 1100, described below in reference to FIG. 11, which may return an entropy block size to use in accordance with at least the present embodiment. As is explained above, the entropy block size may be selected according the current coding block size. In at least the present embodiment, if the current coding block is 8×8, the entropy block size may be 8×8; if the current coding block is larger than 8×8, e.g. 16×16, 32×32, or 64×64, the entropy block size may be 16×16. One entropy block may include N coefficient blocks. In at least the present embodiment, N may, for example, equal six or twenty four when entropy block size is 8×8 and 16×16, as FIG. 5a and FIG. 5b shows, respectively.

At starting loop block 1007, entropy encoding routine 1000 addresses each entropy block for the coding block in turn.

Entropy encoding routine 1000 obtains values for one or more joint symbols S at execution block 1008. For example, if N equals six, entropy encoding routine 1000 may obtain a 6-bit value for a joint symbol value S and, if N equals twenty four, entropy encoding routine 1000 may obtain four 6-bit joint symbol values $S_{0-3}$. The value of each bit in a joint symbol S may represent the coefficient status of a corresponding coefficient block. For example, if all of the coefficients of the i-th coefficient block have a value of zero, the i-th bit in the joint symbol (S) may equal zero, and if any of the coefficients of a given coefficient block have a non-zero value, the corresponding bit in the coding block's joint symbol may equal one.

Entropy encoding routine 1000 obtains a context number (ctx) for the current entropy block at execution block 1010. For example, if the current entropy block is an 8×8 entropy block, the context number may be obtained according to a look up table such as Table 3, above; if the current entropy block is a 16×16 entropy block, the context number may be derived according to a look up table such as Table 4, above.

At starting loop block 1013, entropy encoding routine 1000 addresses each joint symbol S for the entropy block in turn.

Entropy encoding routine 1000 obtains a CBP joint symbol code word for the joint symbol S at execution block 1015. For example, for an 8×8 entropy block or 16×16 entropy block respectively, entropy encoding routine 1000 may select a code word length from a three dimensional Huffman code length based on the range variable (R) for the coding block determined at execution block 1005, the context number (ctx) determined for the entropy block at execution block 1013, and the CBP joint symbol (S), and the CBP joint symbol code word is derived from the selected code word length.

At ending loop block 1018, entropy encoding routine 1000 loops back to starting loop block 1013 and addresses the next joint symbol S, if any.

At starting loop block 1020, entropy encoding routine 1000 addresses each coefficient block of the current coding block in turn. For example, entropy encoding routine 1000 may first address the luma coefficient blocks in raster scan order and then address the chroma coefficient blocks.

At decision block 1023, if the current coefficient block contains a coefficient with a non-zero value, entropy encoding routine 1000 proceeds to execution block 1023; otherwise, if the current coefficient block contains all zero value coefficients, entropy encoding routine 1000 proceeds to ending loop block 1030.

Entropy encoding routine 1000 obtains descriptor code words corresponding to the current coefficient block at execution block 1025. For example, the descriptor code word may be chosen from a selected Huffman coding length table, depending on the characteristics of the coding block and the coefficient block, as is described above.

Entropy encoding routine 1000 obtains level code words corresponding to the current coefficient block at execution block 1025. For example, the level code word may be chosen from a selected Huffman coding length table, depending on the characteristics of the coding block and the coefficient block.

At ending loop block 1030, entropy encoding routine 1000 loops back to starting loop block 1020 to address the next coefficient block, if any.

Entropy encoding routine 1000 assembles a bit stream for the current coding block at execution block 1033. For example, the bit stream for the current coding block may include at least each CBP joint symbol code word, each quantized transform coefficient descriptor code word, and each quantized transform coefficient level code word, at execution block 1033.

Entropy encoding routine 1000 terminates at ending block 1099.

Entropy Block Size Selection Sub-Routine

Figure 11:
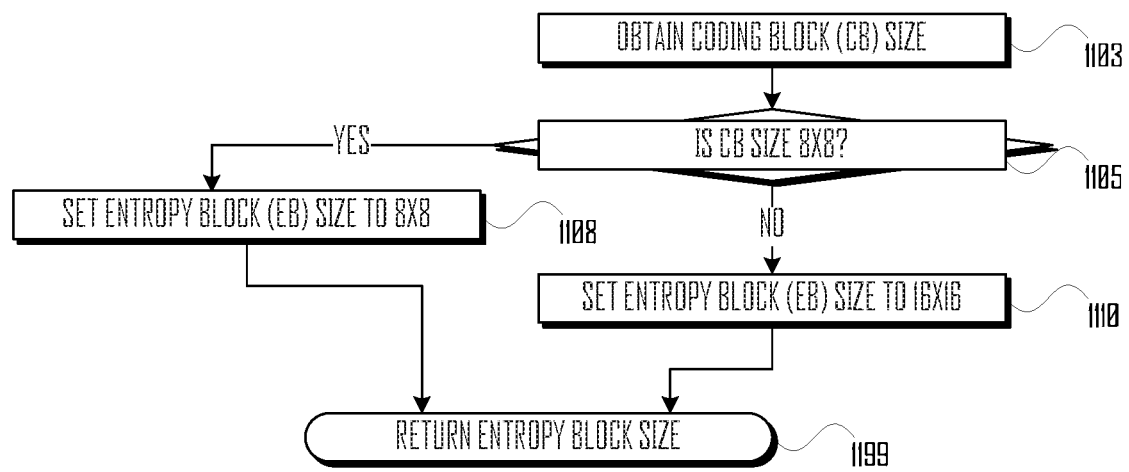
FIG. 11 illustrates a entropy block size selection sub-routine in accordance with at least one embodiment.

FIG. 11 illustrates an entropy block size selection sub-routine 1100 in accordance with certain embodiments.

Entropy block size selection sub-routine 1100 may obtain a coding block size, for example from coding block entropy routine 1000, at execution block 1103.

At decision block 1105, if the coding block size is 8×8, then entropy block size selection sub-routine 1100 proceeds to execution block 1108; else, if the coding block size is greater than 8×8, entropy block size selection sub-routine 1100 proceeds to execution block 1110.

Entropy block size selection sub-routine 1100 may sets the entropy block size to 8×8 at execution block 1108.

Entropy block size selection sub-routine 1100 may set the entropy block size to 16×16 at execution block 1110.

Entropy block size selection sub-routine 1100 may return the entropy block size at return block 1199.

Transform-Block-Recovery Routine

Figure 12:
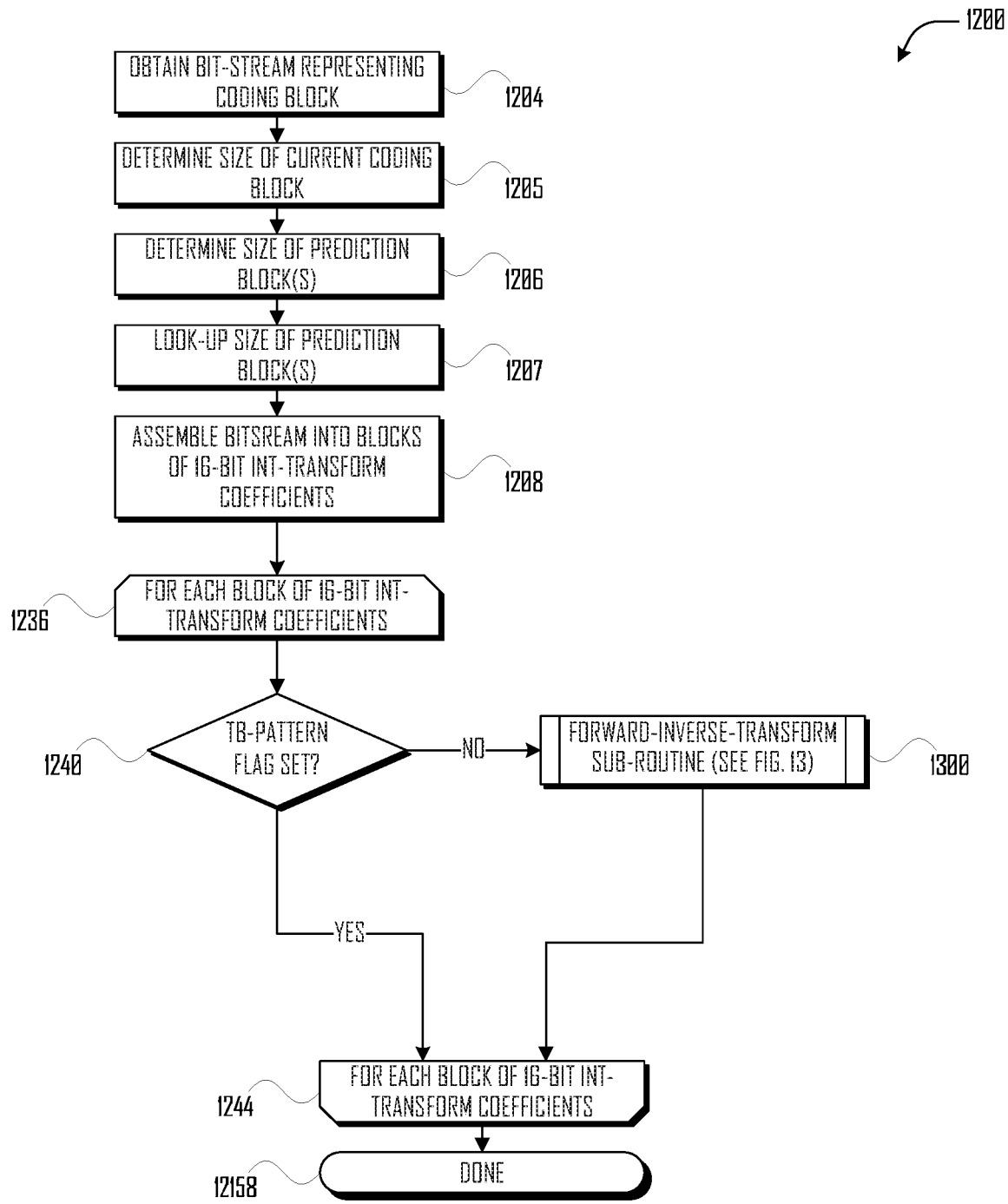
FIG. 12 illustrates a transform-block-recovery routine in accordance with at least one embodiment.

FIG. 12 illustrates a transform-block-recovery routine 1200 suitable for use with at least one embodiment, such as decoder 600. As will be recognized by those having ordinary skill in the art, not all events in the decoding process are illustrated in FIG. 12. Rather, for clarity, only those steps reasonably relevant to describing the transform-block-recovery routine 1200 are shown.

At execution block 1204, transform-block-recovery routine 1200 obtains a block of de-quantized transform coefficients, for example from inverse quantizer 612.

At execution block 1205, transform-block-recovery routine 1200 determines a size of the current coding block.

At execution block 1206, transform-block-recovery routine 1200 determines a size of the prediction block(s) used for motion prediction for the current coding block.

At execution block 1207, transform-block-recovery routine 1200 looks up the size of the prediction blocks for the corresponding combination of current coding block size and the size of the prediction block(s) used for motion prediction for the current coding block.

At execution block 1208, transform-block-recovery routine 1200 then assembles the de-quantized transform coefficients into one or more transform blocks of sixteen-bit integer-transform coefficients according to the transform block sizes obtained at execution block 1207, above.

Beginning at starting loop block 1236, transform-block-recovery routine 1200 processes each transform block of sixteen-bit integer-transform coefficients in turn.

At decision block 1240, if the transform-block-pattern flag for the corresponding transform block is set in the transform block header, then at ending loop block 1244, transform-block-recovery routine 1200 iterates back to starting loop block 1236 to process the next block of sixteen-bit integer-transform coefficients of the current coding block (if any).

If, at decision block 1240, the transform-block-pattern flag for the corresponding transform block is not set in the transform block header, then transform-block-recovery routine 1200 calls inverse-transform sub-routine 1400 (described below in reference to FIG. 14), which returns a block of recovered residual values.

At ending loop block 1244, transform-block-recovery routine 1200 iterates back to starting loop block 1236 to process the next transform block of the current coding block (if any).

Transform-block-recovery routine 1200 ends at termination block 1299.

Inverse-Integer-Transform Sub-Routine

Figure 13:
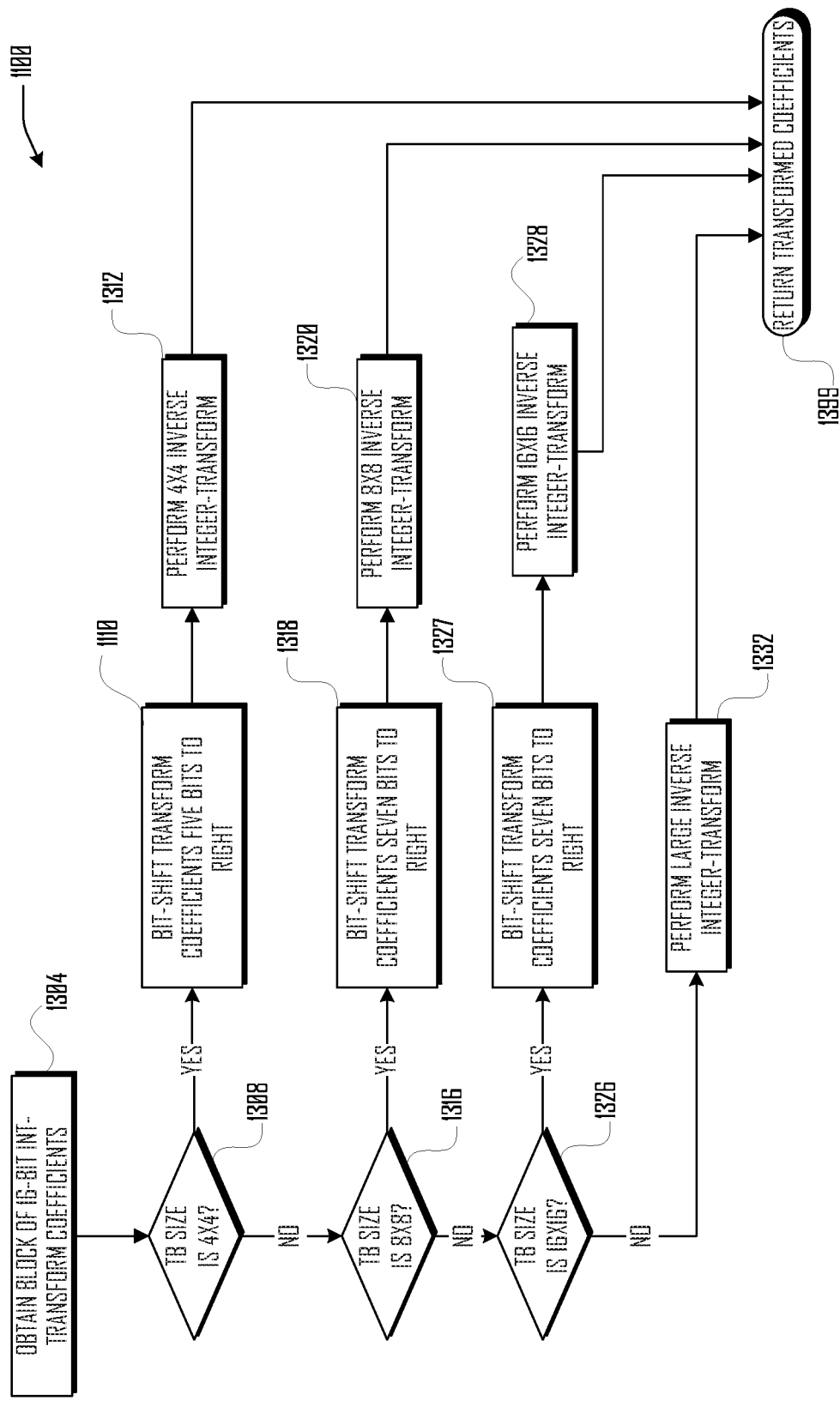
FIG. 13 illustrates an inverse-integer-transform sub-routine in accordance with at least one embodiment.

FIG. 13 illustrates an inverse-integer-transform sub-routine 1300 suitable for use with at least one embodiment, such as transform-block-recovery routine 1000.

At execution block 1304, inverse-integer-transform sub-routine 1300 obtains a transform block, for example from transform-block-recovery routine 1000.

At decision block 1308, if the transform block is a 4×4 transform block, then at execution block 1310, inverse-integer-transform sub-routine 1300 performs a 4×4 inverse-integer transform, for example the 4×4 inverse-integer transform described above. At execution block 1312, inverse-integer-transform sub-routine 1300 bit-shifts the resulting integer transform coefficients five bits to the right. Inverse-integer-transform sub-routine 1300 returns the bit-shifted integer transform coefficients at return block 1399.

Referring again to decision block 1308, if the transform block is not a 4×4 transform block, then inverse-integer-transform sub-routine 1300 proceeds to decision block 1316.

At decision block 1316, if the transform block is an 8×8 transform block, then at execution block 1318, inverse-integer-transform sub-routine 1300 performs an 8×8 inverse-integer transform, for example the 8×8 inverse-integer transform described above. At execution block 1320, inverse-integer-transform sub-routine 1300 bit-shifts the resulting integer transform coefficients seven bits to the right. Inverse-integer-transform sub-routine 1300 returns the bit-shifted integer transform coefficients at return block 1399.

Referring again to decision block 1316, if the transform block is not an 8×8 transform block, then inverse-integer-transform sub-routine 1300 proceeds to decision block 1326.

At decision block 1326, if the transform block is a 16×16 transform block, then at execution block 1327, inverse-integer-transform sub-routine 1300 performs a 16×16 inverse-integer transform, for example the 16×16 inverse-integer transform described above. At execution block 1328, inverse-integer-transform sub-routine 1300 bit-shifts the resulting integer-transform coefficients seven bits to the right. Inverse-integer-transform sub-routine 1300 returns the bit-shifted integer transform coefficients at return block 1399.

Referring again to decision block 1326, if the transform block is larger than a 16×16 transform block, for example a 32×32 or 64×64 transform block, then at execution block 1332, inverse-integer-transform sub-routine 1300 performs a large inverse-transform procedure. At return block 1399, inverse-integer-transform sub-routine 1300 returns the results of the large integer transform procedure.

Although specific embodiments have been illustrated and described herein, it will be appreciated by those of ordinary skill in the art that alternate and/or equivalent implementations may be substituted for the specific embodiments shown and described without departing from the scope of the present disclosure. This application is intended to cover any adaptations or variations of the embodiments discussed herein.

The invention claimed is:

1. A method of encoding an unencoded video frame to generate an encoded bit-stream representative of the unencoded video frame, the encoded bit-stream including at least a coding block header and a video data payload, the method comprising:

obtaining a coding block representing image data for a portion of the unencoded video frame, the coding block including a plurality of coefficient blocks, each coefficient block of the plurality of coefficient blocks containing a plurality of coefficients;

for each coefficient block of the plurality of coefficient blocks, generating a coefficient block pattern flag that indicates whether any of the coefficients of the coefficient block have a non-zero value;

grouping the generated coefficient block pattern flags for the plurality of coefficient blocks of the coding block into at least one multi-bit joint symbol representation;

for each corresponding multi-bit joint symbol of the at least one multi-bit joint symbol representation, deriving a corresponding context number based at least in part on a prediction mode and a transform block size;

mapping each corresponding multi-bit joint symbol of the at least one multi-bit joint symbol representation to a joint symbol code word in a Huffman code length table that is selected based on the corresponding multi-bit joint symbol, a quantization range, and the corresponding context number;

generating the coding block header for the coding block of the encoded bit-stream, the coding block header including the joint symbol code word; and generating the video data payload of the encoded bit-stream, wherein, for each corresponding coefficient block that has a non-zero value, the video data payload includes a descriptor code word representation of coefficient distribution for the corresponding coefficient block and a level code word representation of coefficient magnitudes for the corresponding coefficient block.

2. The method of claim 1 wherein one or more of the plurality of coefficient blocks comprise chroma coefficient blocks, and one or more of the plurality of coefficient blocks comprise luma coefficient blocks, and the at least one multi-bit joint symbol representation is an ordered combination of coefficient block pattern flags of the chroma coefficient blocks positioned in front of coefficient block pattern flags of the luma coefficient blocks.

3. The method of claim 1 wherein the plurality of coefficient blocks comprises four luma coefficient blocks and two chroma coefficient blocks, the method further comprising:

grouping the coefficient block pattern flags for the four luma coefficient blocks and the two chroma coefficient blocks into a six bit joint symbol.

4. The method of claim 3 wherein grouping the coefficient block pattern flags comprises positioning the coefficient block pattern flags for the two chroma coeffcient blocks in front of the coefficient block pattern flags for the four luma coefficient blocks.

5. The method of claim 1 wherein the plurality of coefficient blocks comprises eight chroma coefficient blocks and sixteen luma coefficient blocks, the method further comprising:

grouping the coefficient block pattern flags for the eight chroma coefficient blocks and the sixteen luma coefficient blocks into four six bit joint symbols.

6. The method of claim 5 wherein grouping the coefficient block pattern flags comprises, for each of the four six bit joint symbols, positioning the coefficient block pattern flags for two of the eight chroma coeffcent blocks in front of the coefficient block pattern flags for four of the sixteen luma coefficient blocks.

7. A system operative to encode an unencoded video frame to generate an encoded bit-stream representative of the unencoded video frame, the encoded bit-stream including at least a coding block header and a video data payload, the system comprising:

at least one nontransitory processor-readable storage medium that stores at least one of instructions or data; and at least one processor communicatively coupled to the at least one nontransitory processor-readable storage medium, in operation, the at least one processor:

obtains a coding block representing image data for a portion of the unencoded video frame, the coding block including a plurality of coefficient blocks, each coefficient block of the plurality of coefficient blocks containing a plurality of coefficients;

for each coefficient block of the plurality of coefficient blocks, generates a coefficient block pattern flag that indicates whether any of the coefficients of the coefficient block have a non-zero value;

groups the generated coefficient block pattern flags for the plurality of coefficient blocks of the coding block into one or more multi-bit joint symbols;

for each corresponding multi-bit joint symbol of the one or more multi-bit joint symbols, derives a corresponding context number based at least in part on a prediction mode and a transform block size;

maps each corresponding multi-bit joint symbol of the one or more multi-bit joint symbols to a joint symbol code word in a Huffman code length table that is selected based on the corresponding multi-bit joint symbol, a quantization range, and the corresponding context number;

generates the coding block header for the coding block of the encoded bit-stream, the coding block header including the joint symbol code word; and generates the video data payload of the encoded bit-stream, wherein, for each corresponding coefficient block that has a non-zero value, the video data payload includes a descriptor code word representation of coefficient distribution for the corresponding coefficient block and a level code word representation of coefficient magnitudes for the corresponding coefficient block.

8. The system of claim 7 wherein one or more of the plurality of coefficient blocks comprise chroma coefficient blocks, and one or more of the plurality of coefficient blocks comprise luma coefficient blocks, and the one or more multi-bit joint symbols are combinations of coefficient block pattern flags of the chroma coefficient blocks positioned in front of coefficient block pattern flags of the luma coefficient blocks.

9. The system of claim 7 wherein the plurality of coefficient blocks comprises four luma coefficient blocks and two chroma coefficient blocks, and the at least one processor:

groups the coefficient block pattern flags for the four luma coefficient blocks and the two chroma coefficient blocks into a six bit joint symbol.

10. The system of claim 9 wherein the at least one processor:

positions the coefficient block pattern flags for the two chroma coefficent blocks in front of the coefficient block pattern flags for the four luma coefficient blocks.

11. The system of claim 7 wherein the plurality of coefficient blocks comprises eight chroma coefficient blocks and sixteen luma coefficient blocks, and the at least one processor:

groups the coefficient block pattern flags for the eight chroma coefficient blocks and the sixteen luma coefficient blocks into four six bit joint symbols.

12. The system of claim 11 wherein the at least one processor:

for each of the four six bit joint symbols, positions the coefficient block pattern flags for two of the eight chroma coefficent blocks in front of the coefficient block pattern flags for four of the sixteen luma coefficient blocks.

* * * * *